US012405583B2

(12) United States Patent
Courtney et al.

(10) Patent No.: US 12,405,583 B2
(45) Date of Patent: Sep. 2, 2025

(54) METHOD OF CONTROLLING A MOTORIZED WINDOW TREATMENT

(71) Applicant: LUTRON TECHNOLOGY COMPANY LLC, Coopersburg, PA (US)

(72) Inventors: Brian Michael Courtney, Bethlehem, PA (US); Timothy Gill, Bethlehem, PA (US); Shilpa Sarode, Bethlehem, PA (US)

(73) Assignee: LUTRON TECHNOLOGY COMPANY LLC, Coopersburg, PA (US)

( * ) Notice: Subject to any disclaimer, the term of this patent is extended or adjusted under 35 U.S.C. 154(b) by 0 days.

(21) Appl. No.: 18/603,601

(22) Filed: Mar. 13, 2024

(65) Prior Publication Data

US 2024/0345555 A1 Oct. 17, 2024

Related U.S. Application Data

(63) Continuation of application No. 17/932,354, filed on Sep. 15, 2022, now Pat. No. 11,960,260, which is a
(Continued)

(51) Int. Cl.
  *G05B 15/02* (2006.01)
  *E06B 9/32* (2006.01)
  *E06B 9/68* (2006.01)

(52) U.S. Cl.
  CPC ............... *G05B 15/02* (2013.01); *E06B 9/32* (2013.01); *E06B 9/68* (2013.01);
  (Continued)

(58) Field of Classification Search
  CPC ... G05B 15/02; E06B 9/32; E06B 9/68; E06B 2009/6809; E06B 2009/6827; Y02A 30/24; Y02B 80/00
  See application file for complete search history.

(56) References Cited

U.S. PATENT DOCUMENTS

| 3,646,985 A | 3/1972 | Klann |
| 4,236,101 A | 11/1980 | Luchaco |

(Continued)

FOREIGN PATENT DOCUMENTS

| CN | 101245691 | 8/2008 |
| CN | 101663810 | 3/2010 |

(Continued)

OTHER PUBLICATIONS

Lee E.S. et al., "Integrated Performance of an Automated Venetian Blind/Electric Lighting System in a Full-Scale Private Office", Proceedings of the ASHRAE/DOE/BTECC Conference, Thermal Performance of the Exterior Envelopes of Buildings VII, Clearwater Beach, Florida, Dec. 7-11, 1998.

(Continued)

*Primary Examiner* — Charles R Kasenge
(74) *Attorney, Agent, or Firm* — Duane Morris LLP

(57) ABSTRACT

A method comprises measuring a light intensity at a window; determining if the light intensity exceeds a cloudy-day threshold; operating in a sunlight penetration limiting mode to control the motorized window treatment to control the sunlight penetration distance in the space; enabling the sunlight penetration limiting mode if the light intensity is greater than the cloudy-day threshold; and disabling the sunlight penetration limiting mode if the total lighting intensity is less than the cloudy-day threshold. The cloudy-day threshold is maintained at a constant threshold if a calculated solar elevation angle is greater than a predetermined solar elevation angle, and the cloudy-day threshold varies with time if the calculated solar elevation angle is less than the predetermined solar elevation angle. The cloudy-day threshold is a function of the calculated solar elevation angle if the calculated solar elevation angle is less than the predetermined solar elevation angle.

20 Claims, 17 Drawing Sheets

Related U.S. Application Data continuation of application No. 16/883,395, filed on May 26, 2020, now Pat. No. 11,467,548, which is a continuation of application No. 15/799,461, filed on Oct. 31, 2017, now Pat. No. 10,663,935, which is a continuation of application No. 13/838,876, filed on Mar. 15, 2013, now Pat. No. 9,933,761.

(60) Provisional application No. 61/731,844, filed on Nov. 30, 2012.

(52) U.S. Cl.
CPC .............. *E06B 2009/6809* (2013.01); *E06B 2009/6827* (2013.01); *Y02A 30/24* (2018.01); *Y02B 80/00* (2013.01)

(56) References Cited

U.S. PATENT DOCUMENTS

| | | | |
|---|---|---|---|
| 4,492,908 A | 1/1985 | Stockle et al. |
| 4,567,557 A | 1/1986 | Burns |
| 4,644,990 A | 2/1987 | Webb et al. |
| 4,712,104 A | 12/1987 | Kobayashi |
| 4,841,672 A | 6/1989 | Nebhuth et al. |
| 4,864,201 A | 9/1989 | Bernot |
| 4,881,219 A | 11/1989 | Jacquel |
| 4,993,469 A | 2/1991 | Moench |
| 4,995,442 A | 2/1991 | Marzec |
| 5,088,645 A | 2/1992 | Bell |
| 5,142,133 A | 8/1992 | Kern et al. |
| 5,237,168 A | 8/1993 | Giust et al. |
| 5,237,169 A | 8/1993 | Grehant |
| 5,275,219 A | 1/1994 | Giacomel |
| 5,357,170 A | 10/1994 | Luchaco et al. |
| 5,391,967 A | 2/1995 | Domel et al. |
| 5,467,808 A | 11/1995 | Bell |
| 5,520,415 A | 5/1996 | Lewis |
| 5,532,560 A | 7/1996 | Element et al. |
| 5,598,000 A | 1/1997 | Popat |
| 5,648,656 A | 7/1997 | Begemann et al. |
| 5,663,621 A | 9/1997 | Popat |
| 5,675,487 A | 10/1997 | Patterson et al. |
| 5,729,103 A | 3/1998 | Domel et al. |
| 5,760,558 A | 6/1998 | Popat |
| 5,818,734 A | 10/1998 | Albright |
| 5,883,480 A | 3/1999 | Domel et al. |
| 6,064,949 A | 5/2000 | Werner et al. |
| 6,069,465 A | 5/2000 | de Boois et al. |
| 6,084,231 A | 7/2000 | Popat |
| 6,100,659 A | 8/2000 | Will et al. |
| 6,263,260 B1 | 7/2001 | Bodmer et al. |
| 6,307,331 B1 | 10/2001 | Bonasia et al. |
| 6,528,957 B1 | 3/2003 | Luchaco |
| 6,674,255 B2 | 1/2004 | Schnebly et al. |
| 6,759,643 B2 | 7/2004 | Su et al. |
| 7,085,627 B2 | 8/2006 | Bamberger et al. |
| 7,111,952 B2 | 9/2006 | Veskovic |
| 7,155,296 B2 | 12/2006 | Klasson et al. |
| 7,369,060 B2 | 5/2008 | Veskovic et al. |
| 7,389,806 B2 | 6/2008 | Kates |
| 7,391,297 B2 | 6/2008 | Cash et al. |
| 7,417,397 B2 | 8/2008 | Berman et al. |
| 7,445,035 B2 | 11/2008 | Bruno et al. |
| 7,468,591 B2 | 12/2008 | Bruno |
| 7,566,137 B2 | 7/2009 | Veskovic |
| 7,588,067 B2 | 9/2009 | Veskovic |
| 7,737,653 B2 | 6/2010 | Carmen, Jr. et al. |
| 7,839,109 B2 | 11/2010 | Carmen, Jr. et al. |
| 7,950,827 B2 | 5/2011 | Veskovic |
| 7,963,675 B2 | 6/2011 | Veskovic |
| 7,977,904 B2 | 7/2011 | Berman et al. |
| 8,120,292 B2 | 2/2012 | Berman et al. |
| 8,125,172 B2 | 2/2012 | Berman et al. |
| 8,165,719 B2 | 4/2012 | Kinney et al. |
| 8,197,093 B2 | 6/2012 | Veskovic |
| 8,219,217 B2 | 7/2012 | Bechtel et al. |
| 8,288,981 B2 | 10/2012 | Zaharchuk et al. |
| 8,380,393 B1 | 2/2013 | Ohtomo |
| 8,417,388 B2 | 4/2013 | Altonen et al. |
| 8,432,117 B2 | 4/2013 | Berman et al. |
| 8,456,729 B2 | 6/2013 | Brown et al. |
| 8,508,169 B2 | 8/2013 | Zaharchuk et al. |
| 8,525,462 B2 | 9/2013 | Berman et al. |
| 8,571,719 B2 | 10/2013 | Altonen et al. |
| 8,581,163 B2 | 11/2013 | Grehant et al. |
| 8,587,242 B2 | 11/2013 | Berman et al. |
| 8,624,529 B2 | 1/2014 | Neuman |
| 8,666,555 B2 | 3/2014 | Altonen et al. |
| 8,688,330 B2 | 4/2014 | Werner et al. |
| 8,723,466 B2 | 5/2014 | Chambers et al. |
| 8,723,467 B2 | 5/2014 | Berman et al. |
| 8,779,905 B2 | 7/2014 | Courtney et al. |
| 8,786,236 B2 | 7/2014 | Zaharchuk et al. |
| 8,836,263 B2 | 9/2014 | Berman et al. |
| 8,866,343 B2 | 10/2014 | Abraham et al. |
| 8,890,456 B2 | 11/2014 | Berman et al. |
| 8,901,769 B2 | 12/2014 | Altonen et al. |
| 8,950,461 B2 | 2/2015 | Adams et al. |
| 8,973,303 B2 | 3/2015 | Birru |
| 8,975,778 B2 | 3/2015 | Altonen et al. |
| 9,006,642 B2 | 4/2015 | Wang et al. |
| 9,013,059 B2 | 4/2015 | Altonen et al. |
| 9,447,635 B2 | 9/2016 | Derk |
| 9,933,761 B2 | 4/2018 | Courtney et al. |
| 10,017,985 B2 | 7/2018 | Lundy et al. |
| 10,663,935 B2 | 5/2020 | Courtney et al. |
| 11,467,548 B2 | 10/2022 | Courtney et al. |
| 2001/0027846 A1 | 10/2001 | Osinga |
| 2002/0093297 A1 | 7/2002 | Schnebly et al. |
| 2003/0040813 A1 | 2/2003 | Gonzales et al. |
| 2003/0098133 A1 | 5/2003 | Palmer |
| 2003/0159355 A1 | 8/2003 | Froerer et al. |
| 2003/0188836 A1 | 10/2003 | Whiting |
| 2004/0225379 A1 | 11/2004 | Klasson et al. |
| 2005/0110416 A1* | 5/2005 | Veskovic ............. E06B 9/68 315/149 |
| 2005/0119792 A1 | 6/2005 | Maistre et al. |
| 2005/0131554 A1 | 6/2005 | Bamberger et al. |
| 2006/0185799 A1 | 8/2006 | Kates |
| 2006/0207730 A1 | 9/2006 | Berman et al. |
| 2008/0088180 A1 | 4/2008 | Cash et al. |
| 2008/0183316 A1 | 7/2008 | Clayton |
| 2008/0236763 A1 | 10/2008 | Kates |
| 2009/0222137 A1 | 9/2009 | Berman et al. |
| 2009/0254222 A1 | 10/2009 | Berman et al. |
| 2009/0301672 A1 | 12/2009 | Veskovic |
| 2009/0308543 A1 | 12/2009 | Kates |
| 2010/0071856 A1 | 3/2010 | Zaharchuk et al. |
| 2011/0029139 A1 | 2/2011 | Altonen et al. |
| 2011/0031806 A1 | 2/2011 | Altonen et al. |
| 2011/0164304 A1 | 7/2011 | Brown et al. |
| 2011/0220299 A1 | 9/2011 | Berman et al. |
| 2012/0073765 A1 | 3/2012 | Hontz et al. |
| 2012/0125543 A1 | 5/2012 | Chambers et al. |
| 2012/0133315 A1 | 5/2012 | Berman et al. |
| 2012/0299486 A1 | 11/2012 | Birru |
| 2013/0049664 A1 | 2/2013 | Zaharchuk et al. |
| 2013/0057937 A1 | 3/2013 | Berman et al. |
| 2013/0063065 A1 | 3/2013 | Berman et al. |
| 2013/0263510 A1 | 10/2013 | Gassion |
| 2013/0276371 A1 | 10/2013 | Birru |
| 2013/0306246 A1 | 11/2013 | Zaharchuk et al. |
| 2014/0090787 A1 | 4/2014 | Colson et al. |
| 2014/0145511 A1 | 5/2014 | Renzi et al. |
| 2014/0156079 A1 | 6/2014 | Courtney et al. |
| 2014/0262057 A1 | 9/2014 | Chambers et al. |
| 2014/0265863 A1 | 9/2014 | Gajurel et al. |
| 2014/0318716 A1 | 10/2014 | Patel |
| 2014/0318717 A1 | 10/2014 | Patel |
| 2014/0345807 A1 | 11/2014 | Derk |
| 2015/0129140 A1 | 5/2015 | Dean et al. |
| 2015/0177709 A1 | 6/2015 | Gill |
| 2015/0184459 A1 | 7/2015 | Wang et al. |

(56) References Cited

U.S. PATENT DOCUMENTS

| | | |
|---|---|---|
| 2015/0191971 A1 | 7/2015 | Cavarec et al. |
| 2015/0295411 A1 | 10/2015 | Courtney et al. |
| 2015/0368967 A1 | 12/2015 | Lundy et al. |
| 2016/0047164 A1 | 2/2016 | Lundy et al. |
| 2017/0234068 A1 | 8/2017 | Gill |
| 2018/0119488 A1 | 5/2018 | Lundy et al. |

FOREIGN PATENT DOCUMENTS

| | | |
|---|---|---|
| CN | 102598867 | 7/2012 |
| DE | 19607716 | 9/1997 |
| DE | 10253507 | 5/2004 |
| EP | 0771929 | 5/1997 |
| EP | 0844361 | 5/1998 |
| FR | 2544887 | 4/1983 |
| JP | 01105896 | 4/1989 |
| JP | H0291348 | 3/1990 |
| JP | 6280460 | 10/1994 |
| JP | 08004452 | 9/1996 |
| JP | H09158636 | 6/1997 |
| JP | 10072985 | 3/1998 |
| JP | 200054762 | 2/2000 |
| JP | 200096956 | 4/2000 |
| WO | 9615650 | 5/1996 |
| WO | 03098125 | 11/2003 |
| WO | 2012080589 | 6/2012 |
| WO | 2013112255 | 8/2013 |

OTHER PUBLICATIONS

Office Action issued in connection with European patent No. 13811660.3, Jul. 11, 2017, 4 pages.

First Office Action issued in connection with Chinese patent application No. 201380071795.9, Apr. 6, 2016, 6 pages.

International Search Report and Written Opinion issued Jul. 1, 2014, in PCT application No. PCT/US2014/022412.

International Search Report/Written Opinion issued Nov. 13, 2014 in counterpart PCT application No. PCT/US2014/051059.

International Search Report and Written Opinion dated Oct. 7, 2014 of corresponding application PCT/US2013/071642 filed Nov. 25, 2013.

Lee, E.S. et al.., "Low-cost Networking for Dynamic Window Systems". Submitted Oct. 2, 2003, accepted Dec. 19, 2003 and published in Energy and Buildings 36 (2004) 503-513.

* cited by examiner

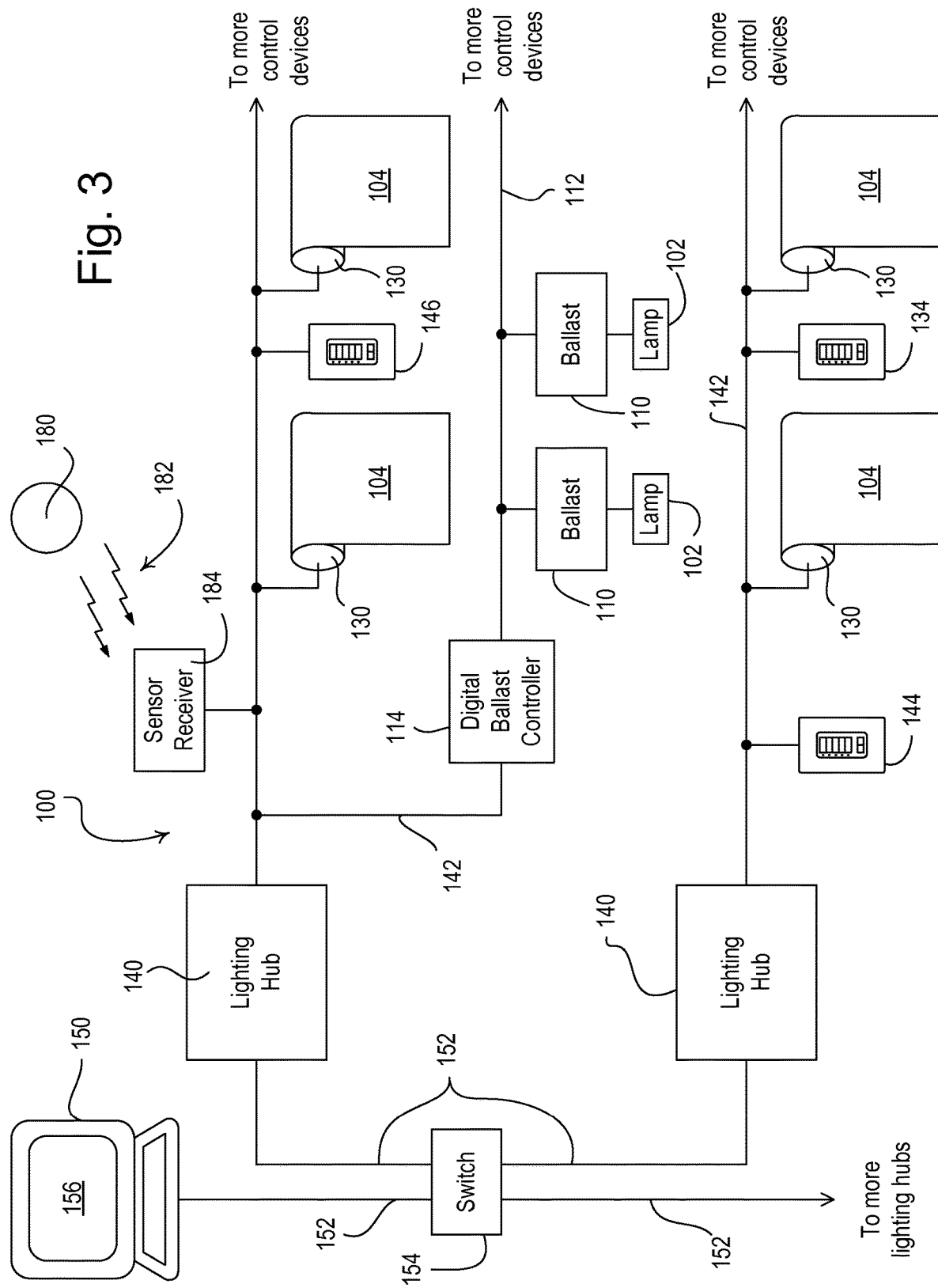

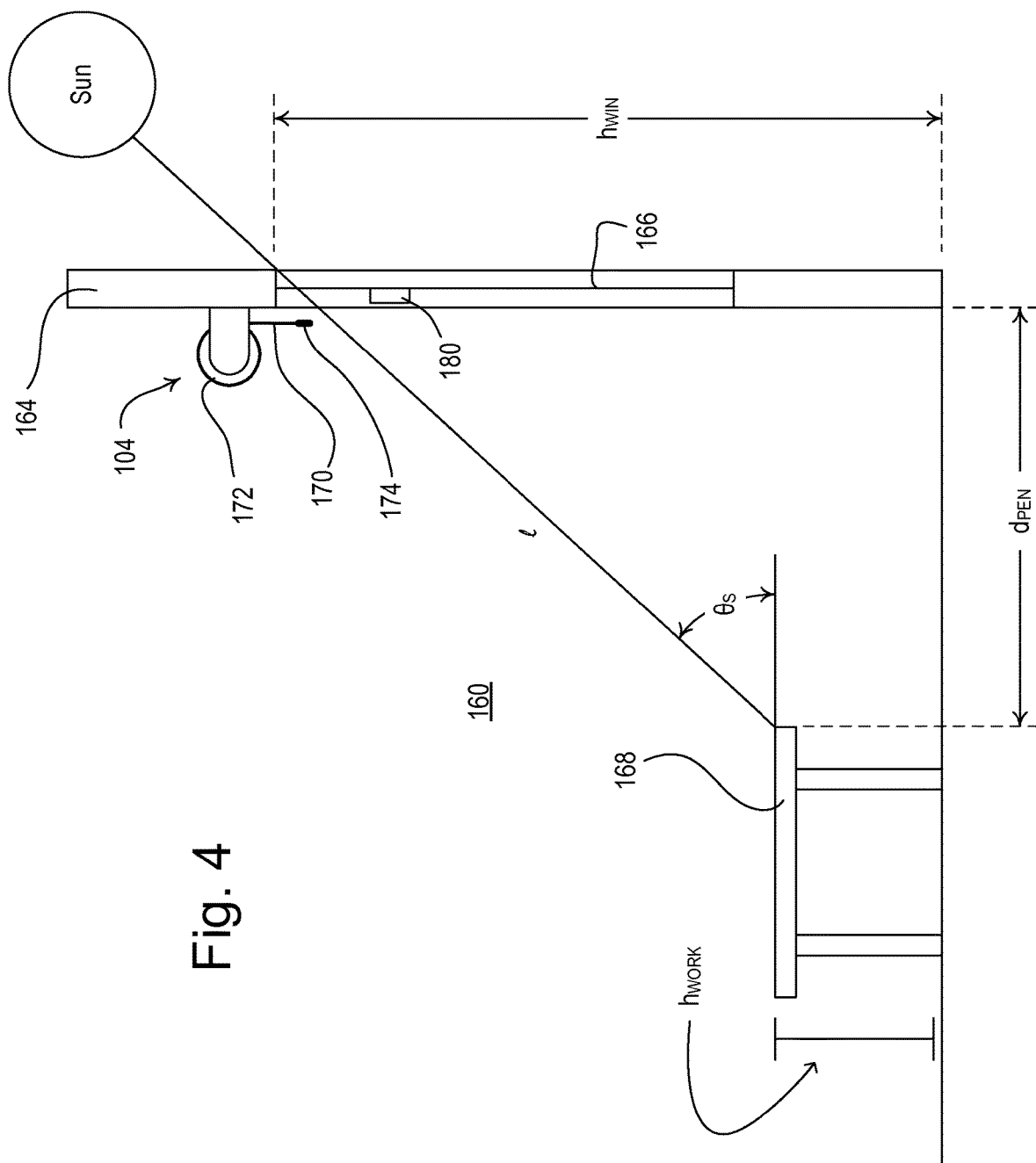

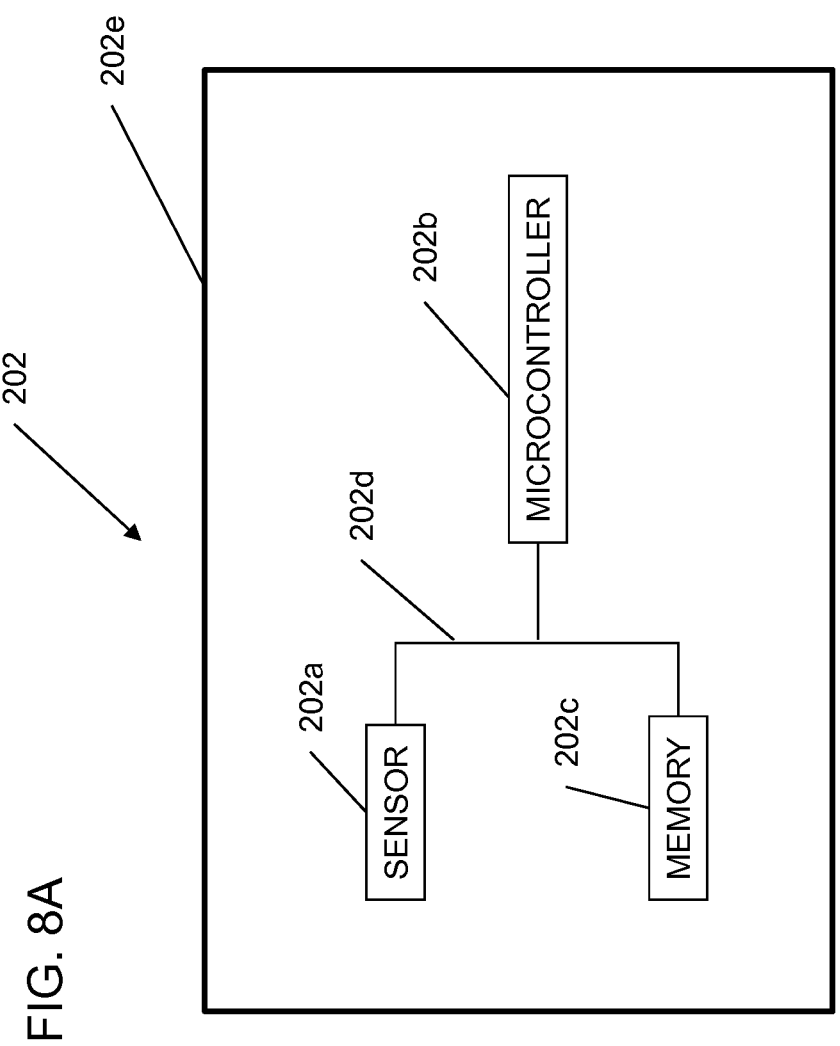

METHOD OF CONTROLLING A MOTORIZED WINDOW TREATMENT

CROSS-REFERENCE TO RELATED APPLICATIONS

This Application is a continuation of U.S. patent application Ser. No. 17/932,354, filed Sep. 15, 2022, which is a continuation of U.S. patent application Ser. No. 16/883,395, filed May 26, 2020 (now U.S. Pat. No. 11,467,548 issued on Oct. 11, 2022), which is a continuation of U.S. patent application Ser. No. 15/799,461, filed on Oct. 31, 2017 (now U.S. Pat. No. 10,663,935, Issued on May 26, 2020), which is a continuation of U.S. patent application Ser. No. 13/838,876, filed on Mar. 15, 2013 (now U.S. Pat. No. 9,933,761, Issued on Apr. 3, 2018), which claims the benefit of U.S. Provisional Patent Application No. 61/731,844, filed on Nov. 30, 2012, each of which is incorporated by reference herein in its entirety.

FIELD

The present invention relates to a load control system for controlling a plurality of motorized window treatments in a space, and more particularly, to a procedure for automatically controlling one or more motorized window treatments to prevent direct sun glare on work spaces in the space.

BACKGROUND

Motorized window treatments, such as, for example, motorized roller shades and draperies, provide for control of the amount of sunlight entering a space. Some prior art motorized window treatments have been automatically controlled in response to various inputs, such as daylight sensors and timeclocks, to control the amount of daylight entering a space to adjust the total lighting level in the space to a desired level. For example, the load control system may attempt to maximize the amount of daylight entering the space in order to minimize the intensity of the electrical lighting in the space. In addition, some prior art load control systems additionally controlled the positions of the motorized window treatments to prevent sun glare in the space to increase occupant comfort, for example, as described in greater detail in commonly-assigned U.S. Pat. No. 7,950,827, issued May 31, 2011, entitled ELECTRICALLY CONTROLLABLE WINDOW TREATMENT SYSTEM TO CONTROL SUN GLARE IN A SPACE, the entire disclosure of which is hereby incorporated by reference.

One prior art load control system controlled the position of motorized roller shades to limit the sunlight penetration depth in the space to a maximum penetration depth while minimizing movements of the roller shades to minimize occupant distractions, as described in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference. Specifically, the load control system controls the position of the motorized roller shades in response to a calculated position of the sun to thus limit the sunlight penetration depth in the space on sunny days. During a cloudy day, the load control system is operable to stop controlling the motorized window treatments to limit the sunlight penetration depth to the maximum penetration depth and to simply adjust the positions of the motorized window treatments to predetermined positions. For example, the load control system may comprise a photosensor (i.e., a daylight sensor or a radiometer) mounted to a window or to the outside of the building for detecting a cloudy condition. The load control system may detect the cloudy condition, for example, if a total light level measured by the photosensor is below a constant threshold $TH_{CONST}$.

FIGS. 1 and 2 show example plots of the total light level $L_{SENSOR}$ measured by the photosensor on a sunny day and a cloudy day, respectively. On both sunny and cloudy days, the total light level $L_{SENSOR}$ measured by the photosensor increases from zero at sunrise (i.e., at time $t_{SUNRISE}$) and then begins to decrease toward zero at sunset (i.e., at time $t_{SUNSET}$). On the cloudy day shown in FIG. 2, the total light level $L_{SENSOR}$ measured by the photosensor does not exceed the constant threshold $TH_{CONST}$, such that the load control system controls the motorized window treatments to predetermined positions (i.e., the load control system will not control the motorized window treatments to limit the sunlight penetration depth to the maximum penetration depth at any point in the day). On the sunny day shown in FIG. 1, the load control system begins to control the motorized window treatments to limit the sunlight penetration depth to the maximum penetration depth when the total light level $L_{SENSOR}$ measured by the photosensor exceeds the constant threshold $TH_{CONST}$ at time $t_{ENABLE}$, and then stops controlling the motorized window treatments to limit the sunlight penetration depth to the maximum penetration depth when the total light level $L_{SENSOR}$ measured by the photosensor drops below the constant threshold $TH_{CONST}$ at time $t_{DISABLE}$.

However, on the sunny day near sunrise and sunset as shown in FIG. 1, the load control system may mistakenly conclude that the present day is cloudy when the total light level $L_{SENSOR}$ measured by the photosensor is less than the constant threshold $TH_{CONST}$ (i.e., between $t_{SUNRISE}$ and $t_{ENABLE}$ and between $t_{DISABLE}$ and $t_{SUNSET}$). At these times, the sun may be very low in the sky and may shine directly into the windows of the building, thus creating glare conditions. Thus, there is a need for a load control system that is able to more accurately distinguish between sunny and cloudy days in order to prevent glare around sunrise and sunset on sunny days.

SUMMARY

In some embodiments, a method of controlling a motorized window treatment is provided for adjusting the amount of sunlight entering a space of a building through a window to control a sunlight penetration distance in the space. The method comprises: (1) measuring a total light intensity at the window; (2) determining if the total light intensity exceeds a cloudy-day threshold; (3) operating in a sunlight penetration limiting mode to control the motorized window treatment to thus control the sunlight penetration distance in the space; (4) enabling the sunlight penetration limiting mode if the total light intensity is greater than the cloudy-day threshold; and (5) disabling the sunlight penetration limiting mode if the total lighting intensity is less than the cloudy-day threshold. According to one embodiment of the present invention, the cloudy-day threshold is maintained at a constant threshold if a calculated solar elevation angle is greater than a predetermined solar elevation angle, and the cloudy-day threshold varies with time if the calculated solar elevation angle is less than the predetermined solar elevation angle. According to another embodiment of the present invention, the cloudy-day threshold is a function of the calculated solar elevation angle if the calculated solar elevation angle is less than the predetermined solar elevation angle.

In some embodiments, a method of controlling a motorized window treatment positioned adjacent to a window on a wall of a building comprises: sampling a total light intensity outside of the building; computing a rate of change of the total light intensity; automatically controlling movement of the window treatment in a sunny operation mode if the computed absolute value of the rate of change is at least a first threshold value; and automatically controlling movement of the window treatment in a cloudy operation mode if the computed absolute value of the rate of change is less than the first threshold value and the total light intensity is less than a second threshold value.

In some embodiments, a method of controlling a motorized window treatment positioned adjacent to a window on a wall of a building comprises: (a) sampling a total light intensity outside of the building; (b) computing a rate of change of the total light intensity; (c) automatically controlling movement of the window treatment based on the total light intensity if the total light intensity is at least a first threshold value; and (d) automatically controlling movement of the window treatment based at least partially on an absolute value of the rate of change of the total light intensity if the total light intensity is less than the first threshold value.

Other features and advantages of the present invention will become apparent from the following description of the invention that refers to the accompanying drawings.

BRIEF DESCRIPTION OF THE DRAWINGS

FIG. 3 is a simplified block diagram of a load control system having at least one motorized roller shade and a cloudy-day sensor according to an embodiment of the present invention.

FIG. 4 is a simplified side view of an example of a space of a building having a window covered by the motorized roller shade of the load control system of FIG. 3.

FIG. 8A is a block diagram of a sensor used in some embodiments of the motorized window treatment shown in FIG. 8.

DETAILED DESCRIPTION

Figure 1:
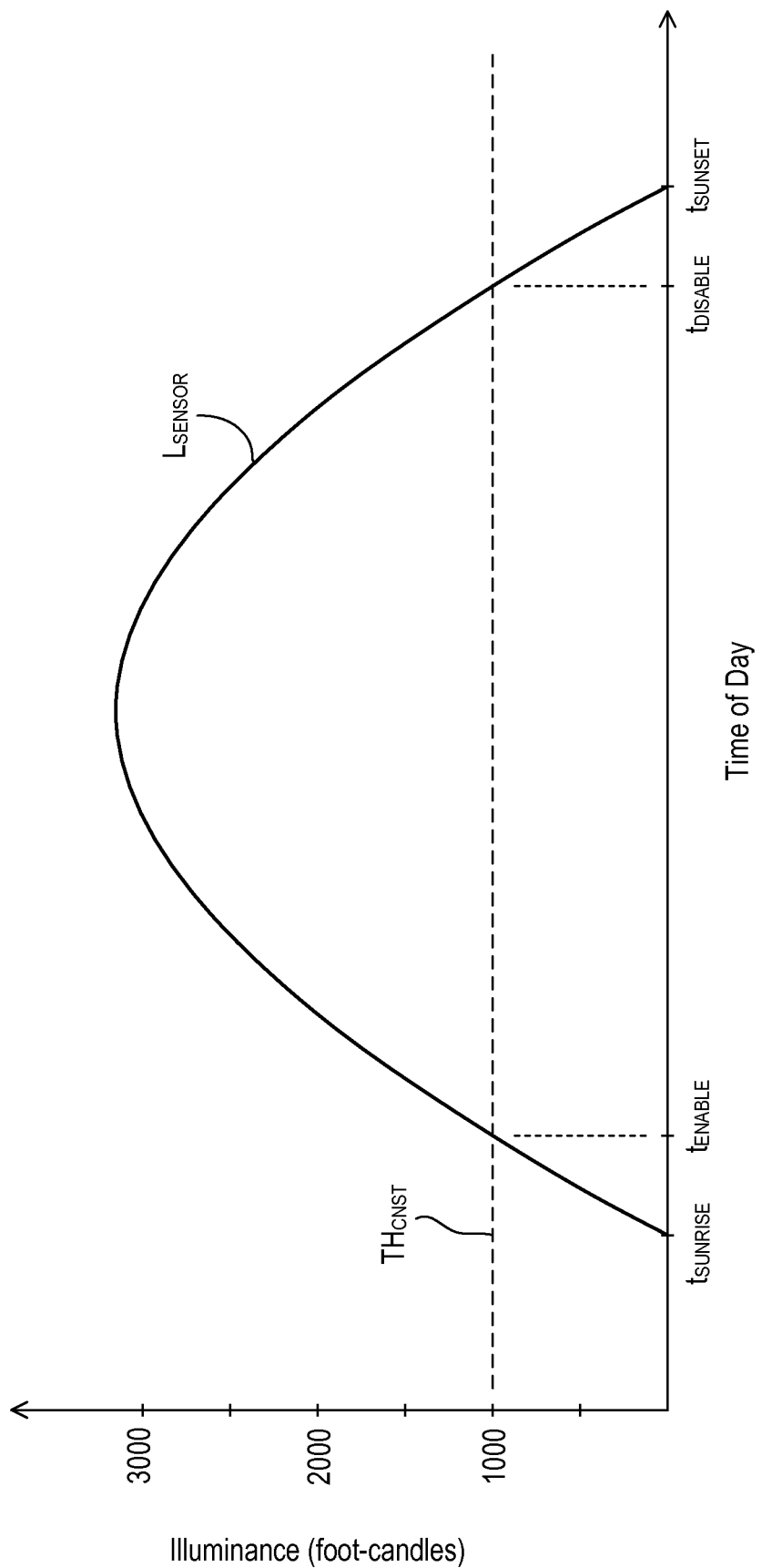
FIG. 1 shows an example plot of a total light level measured a photosensor located on a building on a sunny day.
Figure 2:
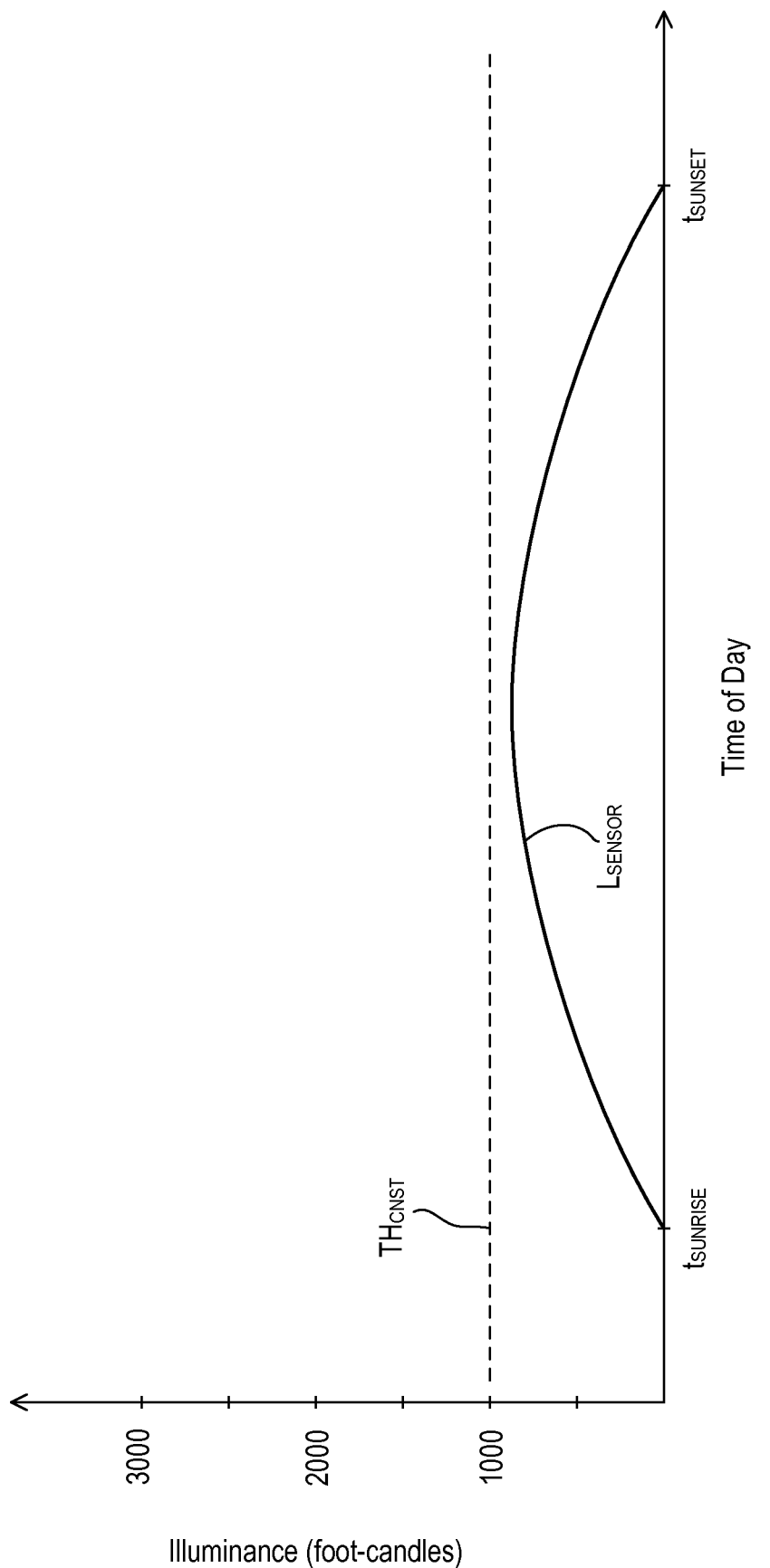
FIG. 2 shows an example plot of a total light level measured a photosensor located on a building on a cloudy day.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 3 is a simplified block diagram of a load control system 100 according to an embodiment of the present invention. The load control system 100 is operable to control the level of illumination in a space by controlling the intensity level of the electrical lights in the space and the daylight entering the space. As shown in FIG. 3, the load control system 100 is operable to control the amount of power delivered to (and thus the intensity of) a plurality of lighting loads, e.g., a plurality of fluorescent lamps 102. The load control system 100 is further operable to control the position of a plurality of motorized window treatments, e.g., motorized roller shades 104, to control the amount of sunlight entering the space. The motorized window treatments could alternatively comprise motorized draperies, blinds, roman shades, or skylight shades. The load control system comprises a plurality of lighting hubs 140, which act as central controllers for managing the operation of the lighting loads (i.e., the plurality of fluorescent lamps 102) and the motorized window treatments (i.e., the motorized roller shades 104).

Each of the fluorescent lamps 102 is coupled to one of a plurality of digital electronic dimming ballasts 110 for control of the intensities of the lamps. The ballasts 110 are operable to communicate with each other via digital ballast communication links 112 (i.e., the ballasts are operable to transmit digital messages to the other ballasts via the digital ballast communication links). Each digital ballast communication link 112 is also coupled to a digital ballast controller (DBC) 114, which provides the necessary direct-current (DC) voltage to power the communication link 112 and assists in the programming of the load control system 100. For example, the digital ballast communication link 112 may comprise a digital addressable lighting interface (DALI) communication link. The lighting hubs 140 are coupled to the digital ballast controllers 114 via respective lighting hub communication links 142, such that the lighting hubs are operable to transmit digital messages to the ballasts 110.

Each of the motorized roller shades 104 comprises an electronic drive unit (EDU) 130, which may be located, for example, inside a roller tube of the associated roller shade. Each electronic drive units 130 is coupled to one of the lighting hub communication links 142 for receiving digital messages from the respective lighting hub 140. An example of a motorized window treatment control system is described in greater detail in commonly-assigned U.S. Pat. No. 6,983,783, issued Jun. 11, 2006, entitled MOTORIZED SHADE CONTROL SYSTEM, the entire disclosure of which is hereby incorporated by reference. Alternatively, the lighting hubs 140 may be operable to transmit wireless signals, for example, radio-frequency (RF) signals, to the electronic drive units 130 for controlling the motorized roller shades. Examples of a radio-frequency motorized window treatments are described in greater detail in commonly-assigned U.S. Pat. No. 7,723,939, issued May 25, 2010, entitled RADIO-FREQUENCY CONTROLLED MOTORIZED ROLLER SHADE, and U.S. Patent Application Publication No. 2012/0261078, published Oct. 18, 2012, entitled MOTORIZED WINDOW TREATMENT, the entire disclosures of which are hereby incorporated by reference.

The load control system 100 further comprises wallstations 144, 146 coupled to the lighting hub communication links 142 for controlling the load control devices (i.e., the ballasts 110 and the electronic drive units 130) of the load control system. For example, actuations of buttons on the first wallstation 144 may turn one or more of the lamps 102 on and off or adjust the intensities of one or more of the lamps. In addition, actuations of the buttons of the second wallstation 146 may open or close the one or more of the motorized roller shades 104, adjust the positions of one or more of the motorized roller shades, or control one or more of the motorized roller shades to preset shade positions between an open-limit position (e.g., a fully-open position $P_{FO}$) and a closed-limit position (e.g., a fully-closed position $P_{FC}$).

The lighting hubs 140 are further coupled to a personal computer (PC) 150 via a network (e.g., having an Ethernet link 152 and a standard Ethernet switch 154), such that the PC is operable to transmit digital messages to the ballasts 110 and the electronic drive units 130 via the lighting hubs 140. The PC 150 executes a graphical user interface (GUI) software, which is displayed on a PC screen 156. The GUI software allows the user to configure and monitor the operation of the load control system 100. During configuration of the lighting control system 100, the user is operable to determine how many ballasts 110, digital ballast controllers 114, electronic drive units 130, and lighting hubs 140 that are connected and active using the GUI software. Further, the user may also assign one or more of the ballasts 110 to a zone or a group, such that the ballasts 110 in the group respond together to, for example, an actuation of a wallstation. The lighting hubs 140 may also be operable to receive digital messages via the network from a smart phone (e.g., an iPhone® smart phone, an Android® smart phone, or a Blackberry® smart phone), a tablet (e.g., an iPad® handheld computing device), or any other suitable Internet-Protocol-enabled device.

The load control system 100 may operate in a sunlight penetration limiting mode to control the amount of sunlight entering a space 160 (FIG. 4) of a building to control a sunlight penetration distance $d_{PEN}$ in the space. Specifically, the lighting hubs 140 are operable to transmit digital messages to the motorized roller shades 104 to control the sunlight penetration distance $d_{PEN}$ in the space 160. Each lighting hub 140 comprises an astronomical timeclock and is able to determine the sunrise time $t_{SUNRISE}$ and the sunset time $t_{SUNSET}$ for each day of the year for a specific location. The lighting hubs 140 each transmit commands to the electronic drive units 130 to automatically control the motorized roller shades 104 in response to a timeclock schedule. Alternatively, the PC 150 could comprise the astronomical timeclock and could transmit the digital messages to the motorized roller shades 104 to control the sunlight penetration distance $d_{PEN}$ in the space 160.

The load control system 100 further comprises a cloudy-day sensor 180 that may be mounted to the inside surface of a window 166 (FIG. 4) in the space 160 or to the exterior of the building. The cloudy-day sensor 180 may be battery-powered and may be operable to transmit wireless signals, e.g., radio-frequency (RF) signals 182, to a sensor receiver module 184 as shown in FIG. 3. The sensor receiver module 184 is operable to transmit digital messages to the respective lighting hub 140 via the lighting hub communication link 142 in response to the RF signals 182 from the cloudy-day sensor 180. Accordingly, in response to digital messages received from the cloudy-day sensor 180 via the sensor receiver module 184, the lighting hubs 140 are operable to enable and disable the sunlight penetration limiting mode as will be described in greater detail below. The load control system 100 may comprise a plurality of cloudy-day sensors located at different windows around the building (as well as a plurality of sensor receiver modules), such that the load control system 100 may enable the sunlight penetration limiting mode in some areas of the building and not in others. Alternatively, the cloudy-day sensor 180 may be coupled to the sensor receiver module 184 via a wired control link or directly coupled to the lighting hub communication link 142.

FIG. 4 is a simplified side view of an example of the space 160 illustrating the sunlight penetration distance $d_{PEN}$, which is controlled by the motorized roller shades 104. As shown in FIG. 4, the building comprises a façade 164 (e.g., one side of a four-sided rectangular building) having a window 166 for allowing sunlight to enter the space. The space 160 also comprises a work surface, e.g., a table 168, which has a height $h_{WORK}$. The cloudy-day sensor 180 may be mounted to the inside surface of the window 166 as shown in FIG. 4. The motorized roller shade 104 is mounted above the window 166 and comprises a roller tube 172 around which the shade fabric 170 is wrapped. The shade fabric 170 may have a hembar 174 at the lower edge of the shade fabric. The electronic drive unit 130 rotates the roller tube 172 to move the shade fabric 170 between the fully-open position $P_{FO}$ (in which the window 166 is not covered) and the fully-closed position $P_{FC}$ (in which the window 166 is fully covered). Further, the electronic drive unit 130 may control the position of the shade fabric 170 to one of a plurality of preset positions between the fully-open position $P_{FO}$ and the fully-closed position $P_{FC}$.

The sunlight penetration distance $d_{PEN}$ is the distance from the window 166 and the façade 164 at which direct sunlight shines into the room. The sunlight penetration distance $d_{PEN}$ is a function of a height $h_{WIN}$ of the window 166 and an angle $\phi_F$ of the façade 164 with respect to true north, as well as a solar elevation angle $\theta_S$ and a solar azimuth angle $\phi_S$, which define the position of the sun in the sky. The solar elevation angle $\theta_S$ and the solar azimuth angle $\phi_S$ are functions of the present date and time, as well as the position (i.e., the longitude and latitude) of the building 162 in which the space 160 is located. The solar elevation angle $\theta_S$ is essentially the angle between a line directed towards the sun and a line directed towards the horizon at the position of the building 162. The solar elevation angle $\theta_S$ can also be thought of as the angle of incidence of the sun's rays on a horizontal surface. The solar azimuth angle $\phi_S$ is the angle formed by the line from the observer to true north and the line from the observer to the sun projected on the ground. When the solar elevation angle $\theta_S$ is small (i.e., around sunrise and sunset), small changes in the position of the sun result in relatively large changes in the magnitude of the sunlight penetration distance $d_{PEN}$.

Figure 5A:
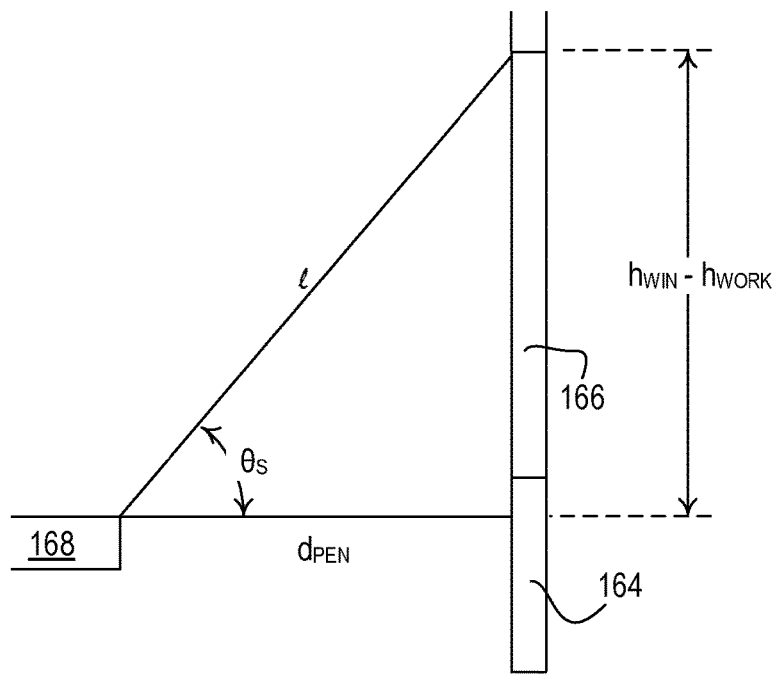
FIG. 5A is a side view of the window of FIG. 4 illustrating a sunlight penetration depth.

The sunlight penetration distance $d_{PEN}$ of direct sunlight onto the table 168 of the space 160 (which is measured normal to the surface of the window 166) can be determined by considering a triangle formed by the length l of the deepest penetrating ray of light (which is parallel to the path of the ray), the difference between the height $h_{WIN}$ of the window 166 and the height $h_{WORK}$ of the table 168, and distance between the table and the wall of the façade 164 (i.e., the sunlight penetration distance $d_{PEN}$) as shown in the side view of the window 166 in FIG. 5A, i.e., $$\tan(\theta_s) = h_{WIN} - h_{WORK}/l, \quad \text{(Equation 1)}$$

where $\theta_S$ is the solar elevation angle of the sun at a given date and time for a given location (i.e., longitude and latitude) of the building.

Figure 5B:
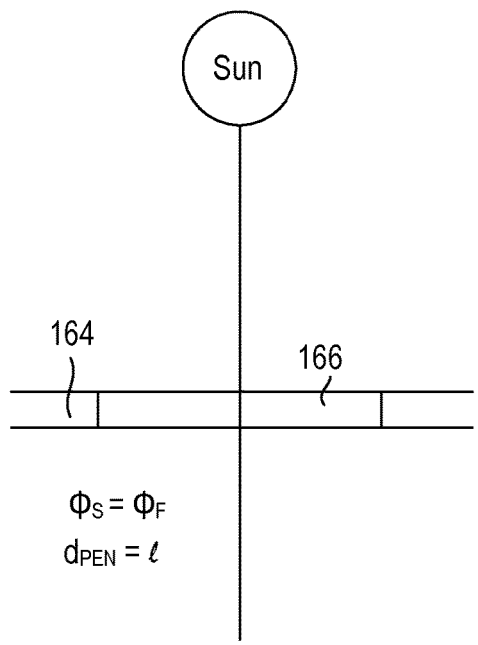
FIG. 5B is a top view of the window of FIG. 4 when the sun is directly incident upon the window.
Figure 5C:
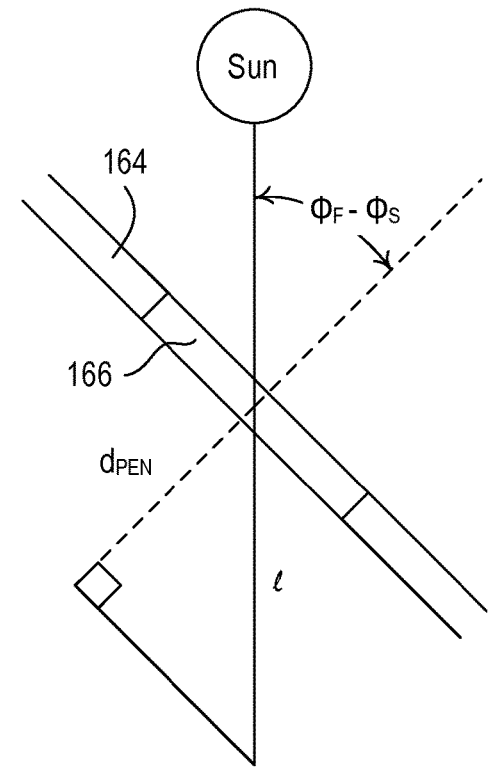
FIG. 5C is a top view of the window of FIG. 4 when the sun is not directly incident upon the window.

If the sun is directly incident upon the window 166, a solar azimuth angle $\phi_S$ and the façade angle $\phi_F$ (i.e., with respect to true north) are equal as shown by the top view of the window 166 in FIG. 5B. Accordingly, the sunlight penetration distance $d_{PEN}$ equals the length l of the deepest penetrating ray of light. However, if the façade angle $\phi_F$ is not equal to the solar azimuth angle $\phi_S$, the sunlight penetration distance $d_{PEN}$ is a function of the cosine of the difference between the angle $\phi_F$ and the solar azimuth angle $\phi_S$, i.e., $$d_{PEN} = l \cdot \cos(|\phi_F - \phi_S|), \quad \text{(Equation 2)}$$

as shown by the top view of the window 166 in FIG. 5C.

As previously mentioned, the solar elevation angle $\theta_S$ and the solar azimuth angle $\theta_S$ define the position of the sun in the sky and are functions of the position (i.e., the longitude and latitude) of the building in which the space 160 is located and the present date and time. The following equations are necessary to approximate the solar elevation angle $\theta_S$ and the solar azimuth angle $\theta_S$. The equation of time defines essentially the difference in a time as given by a sundial and a time as given by a clock. This difference is due to the obliquity of the Earth's axis of rotation. The equation of time can be approximated by $$E = 9.87 \cdot \sin(2B) - 7.53 \cdot \cos(B) - 1.5 \cdot \sin(B), \quad \text{(Equation 3)}$$

where $B = [360° \cdot (N_{DAY} - 81)]/364$, and $N_{DAY}$ is the present day-number for the year (e.g., $N_{DAY}$ equals one for January 1, $N_{DAY}$ equals two for January 2, and so on).

The solar declination $\delta$ is the angle of incidence of the rays of the sun on the equatorial plane of the Earth. If the eccentricity of Earth's orbit around the sun is ignored and the orbit is assumed to be circular, the solar declination is given by:

$$\delta = 23.45° \cdot \sin[360°/365 \cdot (N_{DAY} + 284)]. \quad \text{(Equation 4)}$$

The solar hour angle H is the angle between the meridian plane and the plane formed by the Earth's axis and current location of the sun, i.e., $$H(t) = \{1/4 \cdot [t + E - (4 \cdot \lambda) + (60 \cdot t_{TZ})]\} - 180°, \quad \text{(Equation 5)}$$

where t is the present local time of the day, $\lambda$ is the local longitude, and $t_{TZ}$ is the time zone difference (in unit of hours) between the local time t and Greenwich Mean Time (GMT). For example, the time zone difference $t_{TZ}$ for the Eastern Standard Time (EST) zone is −5. The time zone difference $t_{TZ}$ can be determined from the local longitude $\lambda$ and latitude $\Phi$ of the building 162. For a given solar hour angle H, the local time can be determined by solving Equation 5 for the time t, i.e., $$t = 720 + 4 \cdot (H + \lambda) - (60 \cdot t_{TZ}) - E. \quad \text{(Equation 6)}$$

When the solar hour angle H equals zero, the sun is at the highest point in the sky, which is referred to as "solar noon" time $t_{SN}$, i.e., $$t_{SN} = 720 + (4 \cdot \lambda) - (60 \cdot t_{TZ}) - E. \quad \text{(Equation 7)}$$

A negative solar hour angle H indicates that the sun is east of the meridian plane (i.e., morning), while a positive solar hour angle H indicates that the sun is west of the meridian plane (i.e., afternoon or evening).

The solar elevation angle $\theta_S$ as a function of the present local time t can be calculated using the equation:

$$\theta_S(t) = \sin^{-1}[\cos(H(t)) \cdot \cos(\delta) \cdot \cos(\Phi) + \sin(\delta) \cdot \sin(\Phi)], \quad \text{(Equation 8)}$$

wherein $\Phi$ is the local latitude. The solar azimuth angle $\Phi_S$ as a function of the present local time t can be calculated using the equation:

$$\Phi_S(t) = 180° \cdot C(t) \cdot \cos^{-1}[X(t)/\cos(\theta_S(t))], \quad \text{(Equation 9)}$$

where $$X(t) = [\cos(H(t)) \cdot \cos(\delta) \cdot \sin(\Phi) - \sin(\delta) \cdot \cos(\Phi)], \quad \text{(Equation 10)}$$

and C(t) equals negative one if the present local time t is less than or equal to the solar noon time $t_{SN}$ or one if the present local time t is greater than the solar noon time $t_{SN}$. The solar azimuth angle $\phi_S$ can also be expressed in terms independent of the solar elevation angle $\theta_S$, i.e., $$\Phi_S(t) = \tan^{-1}[-\sin(H(t)) \cdot \cos(\delta)/Y(t)], \quad \text{(Equation 11)}$$

where $$Y(t) = [\sin(\delta) \cdot \cos(\Phi) - \cos(\delta) \cdot \sin(\Phi) \cdot \cos(H(t))]. \quad \text{(Equation 12)}$$

Thus, the solar elevation angle $\theta_S$ and the solar azimuth angle $\phi_S$ are functions of the local longitude $\lambda$ and latitude $\Phi$ and the present local time t and date (i.e., the present day-number $N_{DAY}$). Using Equations 1 and 2, the sunlight penetration distance can be expressed in terms of the height $h_{WIN}$ of the window 166, the height $h_{WORK}$ of the table 168, the solar elevation angle $\theta_S$, and the solar azimuth angle $\Phi_S$.

As previously mentioned, the lighting hubs 140 may operate in the sunlight penetration limiting mode to control the motorized roller shades 104 to limit the sunlight penetration distance $d_{PEN}$ to be less than a desired maximum sunlight penetration distance $d_{MAX}$. For example, the sunlight penetration distance $d_{PEN}$ may be limited such that the sunlight does not shine directly on the table 168 to prevent sun glare on the table. The desired maximum sunlight penetration distance $d_{MAX}$ may be entered using the GUI software of the PC 150 and may be stored in memory in each of the lighting hubs 140. In addition, the user may also use the GUI software of the PC 150 to enter and the present date and time, the present timezone, the local longitude $\lambda$ and latitude $\Phi$ of the building, the façade angle $\phi_F$ for each façade 164 of the building, the height $h_{WIN}$ of the windows 166 in spaces 160 of the building, and the heights $h_{WORK}$ of the workspaces (i.e., tables 168) in the spaces of the building. These operational characteristics (or a subset of these operational characteristics) may also be stored in the memory of each lighting hub 140. Further, the motorized roller shades 104 are also controlled such that distractions to an occupant of the space 160 (i.e., due to movements of the motorized roller shades) are minimized, for example, by only opening and closing each motorized roller shade once each day resulting in only two movements of the shades each day.

The lighting hubs 140 are operable to generate a timeclock schedule defining the desired operation of the motorized roller shades 104 of each of the façades 164 of the building 162 to limit the sunlight penetration distance $d_{PEN}$ in the space 160. For example, the lighting hubs 140 may generate a new timeclock schedule once each day at midnight to limit the sunlight penetration distance $d_{PEN}$ in the space 160 for the next day. The lighting hubs 140 are operable to calculate optimal shade positions of the motorized roller shades 104 in response to the desired maximum sunlight penetration distance $d_{MAX}$ at a plurality of times for the next day. The lighting hubs 140 are then operable to use a user-selected minimum time period $T_{MIN}$ between shade movements as well as the calculated optimal shade positions to generate the timeclock schedule for the next day. Examples of methods of controlling motorized window treatments to minimize sunlight penetration depth using timeclock schedules are described in greater detail in previously-referenced U.S. Pat. No. 8,288,981.

In some cases, when the lighting hub 140 controls the motorized roller shades 104 to the fully-open positions $P_{FO}$ (i.e., when there is no direct sunlight incident on the façade 164), the amount of daylight entering the space 160 may be unacceptable to a user of the space. Therefore, the lighting hub 140 is operable to set the open-limit positions of the motorized roller shades of one or more of the spaces 160 or façades 164 of the building to a visor position $P_{VISOR}$, which is typically lower than the fully-open position $P_{FO}$, but may be equal to the fully-open position. Thus, the visor position $P_{VISOR}$ defines the highest position to which the motorized roller shades 104 will be controlled during the timeclock schedule. The position of the visor position $P_{VISOR}$ may be entered using the GUI software of the PC 150. In addition, the visor position $P_{VISOR}$ may be enabled and disabled for each of the spaces 160 or façades 164 of the building using the GUI software of the PC 150. Since two adjacent windows 166 of the building may have different heights, the visor positions $P_{VISOR}$ of the two windows may be programmed using the GUI software, such that the hembars 174 of the shade fabrics 172 covering the adjacent window are aligned when the motorized roller shades 104 are controlled to the visor positions $P_{VISOR}$.

In response to the RF signals 182 received from the cloudy-day sensor 180, the lighting hubs 140 are operable to disable the sunlight penetration limiting mode (i.e., to stop controlling the motorized roller shades 104 to limit the sunlight penetration distance $d_{PEN}$). Specifically, if the total light level $L_{SENSOR}$ measured by the cloudy-day sensor 180 is below a cloudy-day threshold $TH_{CLOUDY}$, each lighting hub 140 is operable to determine that cloudy conditions exist outside the building and to control one or more of the motorized roller shades 104 to the visor positions $P_{VISOR}$ in order to maximum the amount of natural light entering the space 160 and to improve occupant comfort by providing a better view out of the window 166. However, if the total light level $L_{SENSOR}$ measured by the cloudy-day sensor 180 is greater than or equal to the cloudy-day threshold $TH_{CLOUDY}$, each lighting hub 140 is operable to determine that sunny conditions exist outside the building and to enable the sunlight penetration limiting mode to control the motorized roller shades 104 to limit the sunlight penetration distance $d_{PEN}$ in the space 160 to thus prevent sun glare on the table 168.

Figure 6:
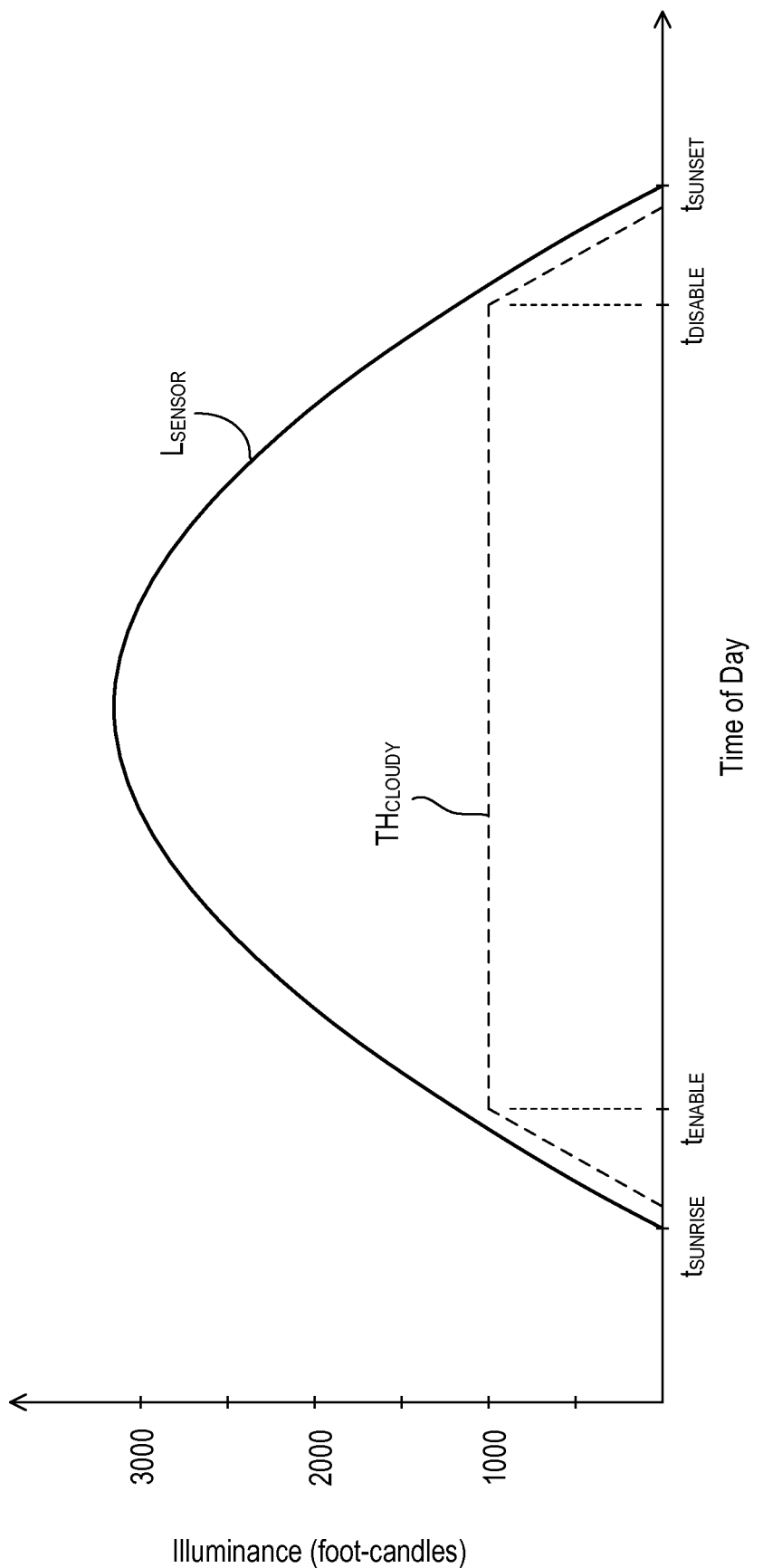
FIG. 6 shows an example plot of the total light level measured by the cloudy-day sensor of the load control system of FIG. 3 on a sunny day and a cloudy-day threshold according to the embodiment of the present invention.

FIG. 6 shows an example plot of the total light level $L_{SENSOR}$ measured by the cloudy-day sensor 180 on a sunny day and the cloudy-day threshold $TH_{CLOUDY}$ used by the lighting hubs 140 according to the embodiment of the present invention. During most of the day, when the calculated solar elevation angle $\theta_S$ is greater than a predetermined cut-off elevation $\theta_{CUT-OFF}$ (e.g., approximately 15°), the cloudy-day threshold $TH_{CLOUDY}$ is maintained constant, for example, at the prior art constant threshold $TH_{CONST}$ (e.g., approximately 1000 foot-candles). To prevent the lighting hubs 140 from mistakenly determining that the present day is a cloudy day around sunrise and sunset, the cloudy-day threshold $TH_{CLOUDY}$ is adjusted as a function of the calculated solar elevation angle $\theta_S$, e.g., $$TH_{CLOUDY} = TH_{CNST} \cdot \frac{\theta_S}{\theta_{CUT-OFF}} \qquad \text{(Equation 13)}$$

Accordingly, the cloudy-day threshold $TH_{CLOUDY}$ varies with time near sunrise and sunset, and is maintained at the constant threshold $TH_{CNST}$ near midday. Since the solar elevation angle $\theta_S$ is approximately linear near sunrise and sunset, the cloudy-day threshold $TH_{CLOUDY}$ is increased somewhat linearly from zero to the cloudy-day threshold $TH_{CLOUDY}$ from the sunrise time $t_{SUNRISE}$ to time $t_{ENABLE}$, and decrease somewhat linearly from the cloudy-day threshold $TH_{CLOUDY}$ to zero from time $t_{DISABLE}$ to the sunset time $t_{SUNSET}$ as shown in FIG. 6. Alternatively, the cloudy-day threshold $TH_{CLOUDY}$ could vary with time for a first predetermined time period after sunrise and a second predetermined time period before sunset.

Figure 7:
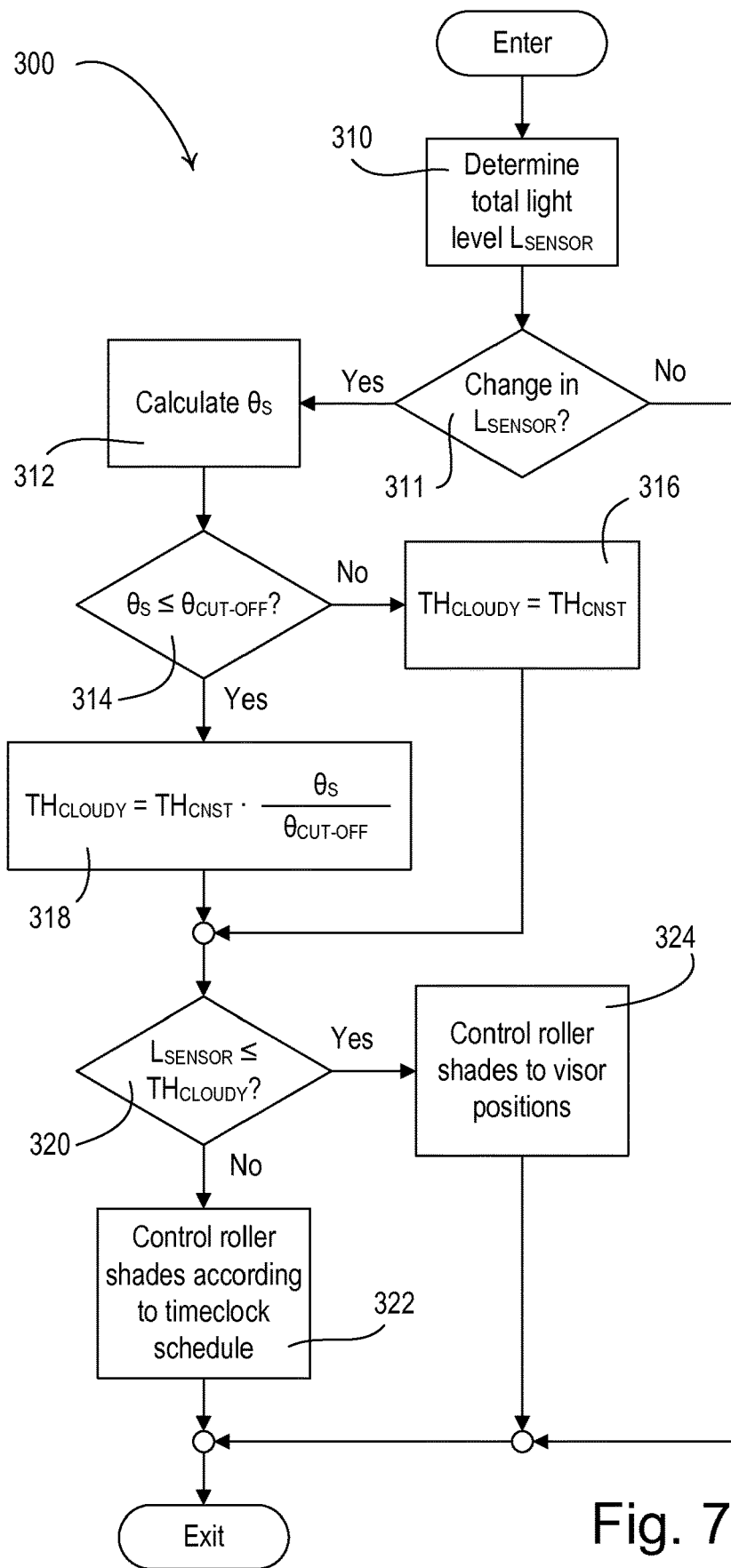
FIG. 7 is a simplified flowchart of a cloudy-day procedure according to the embodiment of the present invention.

FIG. 7 is a simplified flowchart of a cloudy-day procedure 300 executed by each lighting hub 140 periodically (e.g., once every minute). First, the lighting hub 140 determines the total light level $L_{SENSOR}$ at step 310, for example, by recalling from memory the last light level information received from the cloudy-day sensor 180. If, at step 311, the total light level $L_{SENSOR}$ has not changed since the last time that the cloudy-day procedure 300 was executed, the cloudy-day procedure 300 simply exits. However, if the total light level $L_{SENSOR}$ has changed at step 311, the lighting hub 140 calculates the solar elevation angle $\theta_S$ at step 312 (e.g., using equations 1-8 as shown above). If the calculated solar elevation angle $\theta_S$ is greater than the cut-off elevation $\theta_{CUT-OFF}$ (i.e., approximately 15°) at step 314, the lighting hub 140 sets the cloudy-day threshold THCloudy to be equal to the prior art constant threshold $TH_{CONST}$ at step 316. If the calculated solar elevation angle $\theta_S$ is less than or equal to the cut-off elevation $\theta_{CUT-OFF}$ at step 314, the lighting hub 140 calculates the cloudy-day threshold $TH_{CLOUDY}$ as a function of the constant threshold $TH_{CONST}$, the calculated solar elevation angle $\theta_S$, and the cut-off elevation $\theta_{CUT-OFF}$ at step 318 (e.g., as shown in equation 13 above). If, at step 320, the total light level $L_{SENSOR}$ is greater than the cloudy-day threshold $TH_{CLOUDY}$ (as set at step 316 or 318), the lighting hub 140 enables the sunlight penetration limiting mode to control the motorized roller shades 104 according to the timeclock schedule at step 324 (i.e., to limit the sunlight penetration distance $d_{PEN}$ in the space 160), and the cloudy-day procedure 300 exits. If the total light level $L_{SENSOR}$ is less than or equal to the cloudy-day threshold $TH_{CLOUDY}$ at step 320, the lighting hub 140 disables the sunlight penetration limiting mode and controls the motorized roller shades to the visor positions $P_{VISOR}$ at step 324, before the cloudy-day procedure 300 exits.

While the present application has been described with reference to distinguishing between sunny and cloudy days, the concepts of the present application can also be applied to other external conditions that may affect the amount and direction of sunlight entering the space 160, for example, shadow conditions and reflected glare conditions caused by other buildings and objects. For example, the lighting hubs 140 could disable the sunlight penetration limiting mode if the cloudy-day sensor 180 detects that a shadow is on the window 166.

In some embodiments, a method of controlling a motorized window treatment for adjusting the amount of sunlight entering a space of a building through a window to control a sunlight penetration distance in the space, the method comprising:

measuring a total light intensity at the window;
calculating a solar elevation angle;
calculating a cloudy-day threshold as a function of the calculated solar elevation angle;
determining if the total light intensity exceeds the cloudy-day threshold;
operating in a sunlight penetration limiting mode to control the motorized window treatment to thus control the sunlight penetration distance in the space;
enabling the sunlight penetration limiting mode if the total light intensity is greater than the cloudy-day threshold; and
disabling the sunlight penetration limiting mode if the total lighting intensity is less than the cloudy-day threshold.

In some embodiments, the cloudy-day threshold is maintained at a constant threshold if the calculated solar elevation angle is greater than a predetermined solar elevation angle, and the cloudy-day threshold is a function of the calculated solar elevation angle if the calculated solar elevation angle is less than the predetermined solar elevation angle.

Some embodiments further comprise controlling the motorized window treatment to a predetermined position when the sunlight penetration limiting mode is disabled.

Figure 8:
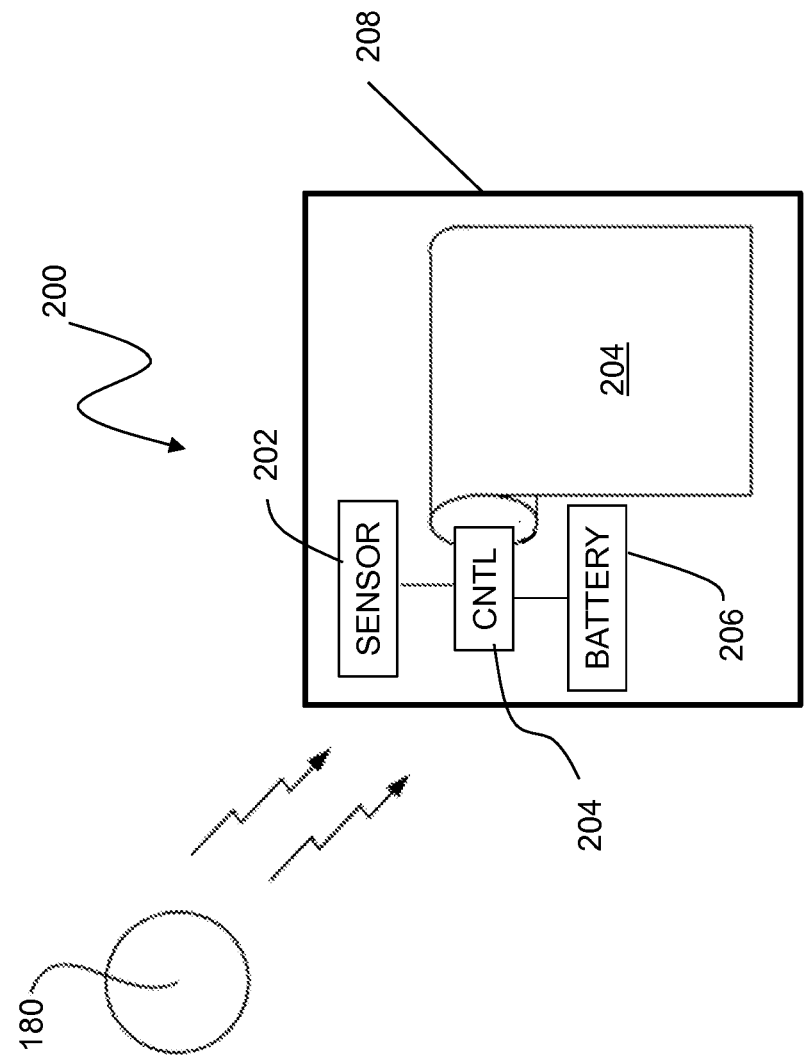
FIG. 8 is a schematic diagram of another embodiment of an automated window treatment system.

FIG. 8 is a schematic diagram of another embodiment of an automatic window treatment system 200, which does not require any externally supplied power, communications, or data. This system 200 can be conveniently installed by a homeowner without performing any wiring. The system does not require the user to input any time or geographic data, or information about the relative position between the window treatment and the sun. The system 200 does not require wireless or wired communications with any other home systems.

System 200 includes a window treatment 104, which may be a roller shade. motorized draperies, blinds, roman shades, skylight shades, or the like. The window treatment 104 is equipped with a power source, such as a receptacle (not shown) for holding a battery 206 and receiving DC power from the battery, to power the motor (not shown) for changing the position of the window treatment 104. In some embodiments, the battery is a commercially available alkaline, NiCd or Lithium ion battery for example. The battery can be re-chargeable or disposable. In other embodiments, the battery is a proprietary internal battery.

The system includes a photosensor 202 which measures the total intensity of the visible light impinging on the photosensor 202. The photosensor 202 may be any of a variety of sensors, such as a photometer, radiometer, photodiode, photoresistor or the like. In some embodiments, the sensor 202 is built into the housing of the window treatment 104. In other embodiments, the photosensor 202 is a separate device which can be installed inside or outside of the window, and connected to the control unit 204 via a wired or wireless connection.

In some embodiments, as shown in FIG. 8A, the photosensor 202 is a "smart device" comprising a sensor 202a, a microcontroller or embedded processor 202b, a non-transitory storage medium such as a memory 202c with instruction and data storage portions, and a bus 202d connecting the sensor, microcontroller and memory, all contained within a single housing 202e. In some embodiments, the sensor, microcontroller or embedded processor, memory, and bus are all mounted on a printed circuit board (not shown) in the housing 202e. In other embodiments, the sensor, microcontroller and memory are contained in separate packages and connected to one another.

The control unit 204 can be a microcontroller or embedded processor programmed with instructions for automatically operating the window treatment 104 to permit light according to a predetermined method, based on the total light intensity and/or the rate of change of the total light intensity. The control unit 204 includes a tangible, non-transitory machine readable storage medium (e.g., flash memory, not shown) encoded with data and computer program code for controlling operation of the window treatment.

Figure 9:
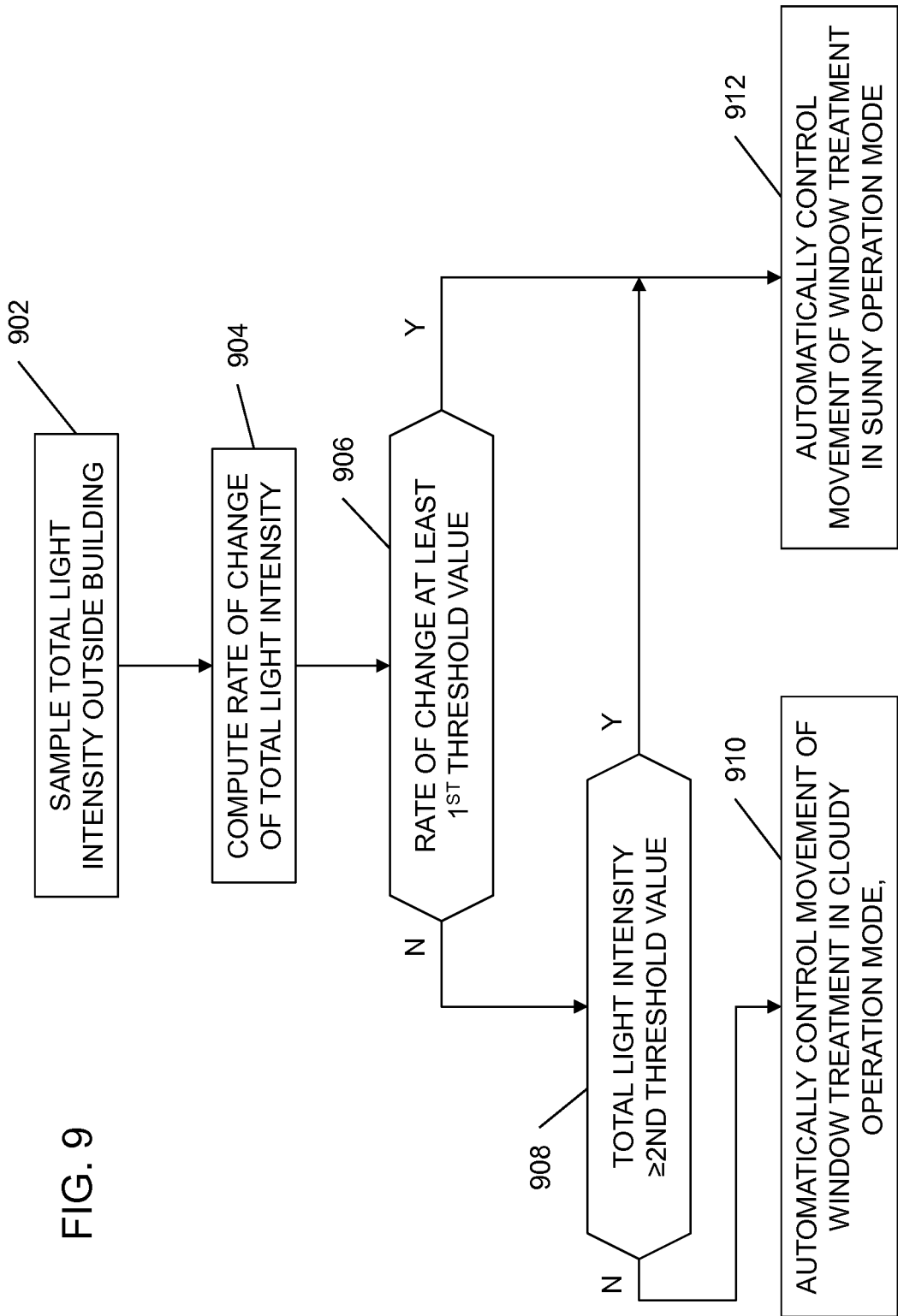
FIG. 9 is a flow chart of a method of operating the system of FIG. 8.

FIG. 9 is a flow chart of a method of controlling a motorized window treatment 104 positioned adjacent to a window 208 on a wall of a building.

At step 902, the method samples a total light intensity outside of the building. This measurement is collected by the photosensor 202. If the photosensor 202 is located outside of the building, it samples the light directly. If the photosensor 202 is mounted on the housing of the window treatment 104 inside the building, then the control unit 204 can apply a correction to the sensor output signal to account for the absorptivity and reflectivity of the window, through which the light penetrates to reach the photosensor 202.

At step 904, the control unit 204 computes a rate of change of the total light intensity. The rate of change is determined numerically by dividing a difference between two light intensity values by a relevant time interval. In some embodiments, the difference is computed by directly subtracting a first light intensity signal value from a second light intensity signal value. Using only two light intensity signal values is computationally simple and quick, and provides rapid response to real changes in lighting conditions. However, if only two sensor samples are used, the computed difference can incorporate sensor noise into the rate of change value, and tends to produce more fluctuations in the rate of change function. In other embodiments, the total light intensity samples are summed, averaged, or numerically integrated over a short sampling period (such as one, two or five minutes, for example). Doing so tends to cancel out random noise and reduce the spikes in the computed rate of change values.

At step 906, the control unit 204 determines whether the absolute value of the rate of change is at least a first threshold value. If the absolute value of the rate of change is greater than or equal to the first threshold value, step 912 is performed. If the absolute value of the rate of change is less than the threshold value, step 908 is performed. For example, in some embodiments, the threshold rate of change between sunny and cloudy is 50 to 100 ticks/minute. In other embodiments, other threshold values are used.

At step 908, a second determination is made, whether the total light intensity is at least a second threshold value. If the total light intensity is greater than or equal to the second threshold value, step 912 is performed. The second threshold value is set empirically at a value that is generally exceeded on most sunny days while the solar elevation angle is greater than a threshold angle (for example, but not limited to, 15 degrees). This corresponds to most daylight time, between and excluding sunrise and sunset on sunny days. If the total light intensity is less than the second threshold value, step 910 is performed. In some embodiments, the second threshold may be set at about 600 foot candles, about 1000 foot-candles. or about 1200 foot candles. In some embodiments, a control on the window treatment allows the occupant to select the second threshold value.

At step 910, when the computed absolute value of the rate of change is less than the first threshold value and the total light intensity is less than a second threshold value the control unit 204 automatically controls movement of the window treatment 104 in a cloudy operation mode.

At step 912, when the computed absolute value of the rate of change is at least the first threshold value or the total light intensity is at least a second threshold value, the control unit 204 automatically controls movement of the window treatment in a sunny operation mode. Thus, the control unit 204 automatically controls movement of the window treatment in the sunny operation mode if (1) the computed absolute value of the rate of change is at least the first threshold value or (2) the computed absolute value of the rate of change is less than the first threshold value and the total light intensity is at least the second threshold value.

As noted above, near sunrise and sunset, the total light intensity is relatively low, even on sunny days. If cloudy day detection is based solely on the comparison to a fixed total light intensity value, a sunny condition can be mistakenly identified as cloudy. At these times, the sun may be very low in the sky and may shine directly into the windows of the building, thus creating solar penetration conditions.

The inventors have determined that at sunrise and sunset, even though the total light intensity value is relatively low regardless of sunny or cloudy conditions, the absolute value of the rate of change of the total light intensity tends to be significantly larger on sunny and partially sunny days than on cloudy days. Thus, the method shown in FIG. 9 provides improved discrimination between sunny and partly sunny days on the one hand and cloudy days on the other hand.

Figures 10A, 10B, 10C:
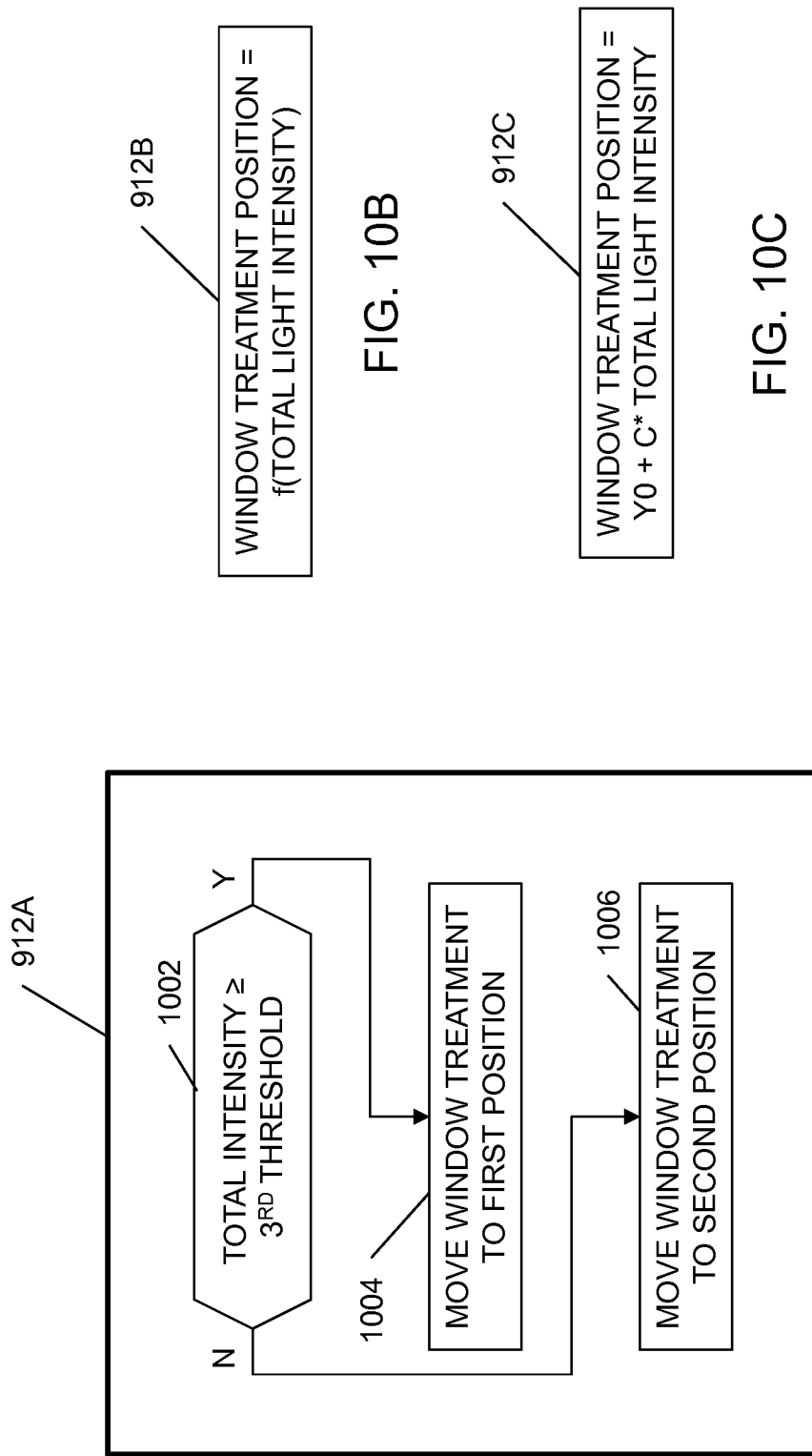
FIGS. 10A-10C show alternative details of block 912 of FIG. 9.

FIG. 10A is an enlarged detail of step 912 of FIG. 9. In this embodiment, the window treatment has two possible sunny operation mode positions. At step 1002, a determination is made whether the total intensity of the light is greater than a third threshold value. If so, step 1004 is performed. Otherwise, step 1006 is performed.

At step 1004, the window treatment is moved to a first position (e.g., fully closed, or from 75% to 90% closed), if the total light intensity is at least a third threshold value.

At step 1006, the window treatment is moved to a second position (e.g., fully open, or from 15% to 25% open), if the total light intensity is less than the third threshold value.

FIG. 10B is a detail of another implementation of step 912 of FIG. 9. In step 912B, the window treatment position is varied as a function of the total light intensity.

FIG. 10C is a detail of another implementation of step 912 of FIG. 9. In some embodiments, the window treatment position is varied as a linear function of the total light intensity. Thus, the window treatment position can be determined by an equation such as:

$$Y = Y_0 + C * (\text{Total Light Intensity}),$$

where Y is the window treatment position (e.g., hem bar position for a roller shade, angle for blinds, or the like), $Y_0$ and C are both constants.

Although FIGS. 10A-10C provide three non-limiting examples of the sunny operation mode which do not require geographic data, solar time, or other externally supplied dynamic data, a variety of sunny operation mode techniques can be used. For example, in systems with communications capability or access to geographic information and solar time, the control unit can control the window treatment in the sunny operation mode to control the solar penetration distance, estimated interior natural light level, estimated interior heat contribution from solar radiation, or the like.

Figure 11:
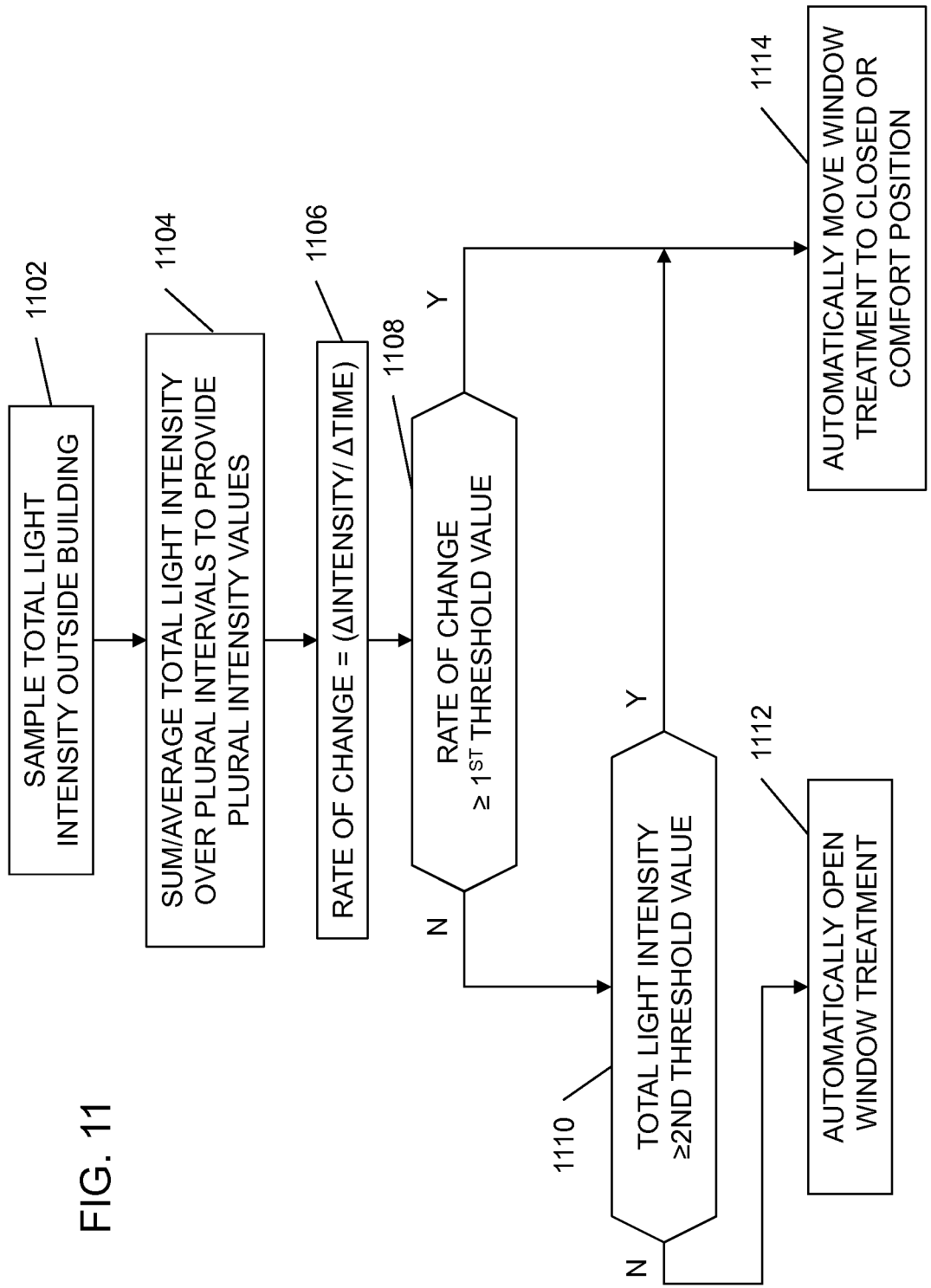
FIG. 11 is a detailed flow chart of an embodiment of the method of FIG. 9.

FIG. 11 is a flow chart showing more details of an implementation of the embodiment of FIG. 9.

At step 1102, the photosensor samples a total light intensity outside of the building. If the photosensor 202 is mounted on the housing of the window treatment 104 inside the building, then the control unit 204 can apply a correction to the sensor output signal to account for the absorptivity and reflectivity of the window, through which the light penetrates to reach the photosensor 202.

At step 1104, the light intensity values are summed, numerically integrated or averaged over plural intervals to provide plural intensity values.

In some embodiments, step 1104 computes the average intensity summing or averaging the sampled total light intensity over each of a plurality of intervals to provide a respective intensity value for each respective interval. For example, in one embodiment, the total light intensity signal from the photosensor 202 is sampled every 30 seconds. Each time five new values are sampled (i.e., every 2.5 minutes), an average total light intensity value and an average time for that 2.5 minute interval is computed. Thus, after five minutes, two average total light intensity values have been computed. The first average value is based on five samples with an average time of 1.25 minutes and the second average value is based on five samples with an average time of 3.75 minutes.

At step 1106, the control unit 204 computes a rate of change of the total light intensity. The rate of change is determined numerically by dividing a difference between two average light intensity values by the relevant time interval. In some embodiments, computing the rate of change includes calculating the rate of change as the difference between first and second sampled total light intensities divided by a length of time between sampling the first total light intensity and sampling the second total light intensity.

In the example above, the difference between the two average light intensity values is divided by (3.75−1.25)=2.5 minutes.

In other embodiments, step 1104 sums (or integrates) the light intensity values without calculating an average; and step 1106 compensates by using a higher threshold for the sum of the intensity values. For example, if five intensity values are summed in step 1004 (without dividing the sum by five), then the threshold rate of change value can be multiplied by five, so that the same sunny/cloudy decision will be reached.

At step 1108, the control unit 204 determines whether the absolute value of the rate of change is at least a first threshold value. If the absolute value of the rate of change is greater than or equal to the first threshold value, step 1014 is performed. If the absolute value of the rate of change is less than the threshold value, step 1010 is performed.

At step 1110, a second determination is made, whether the total light intensity is at least a second threshold value. If the total light intensity is greater than or equal to the second threshold value, step 1114 is performed. If the total light intensity is less than the second threshold value, step 1112 is performed.

At step 1112, when the computed absolute value of the rate of change is less than the first threshold value and the total light intensity is less than a second threshold value the control unit 204 automatically controls movement of the window treatment 104 in a cloudy operation mode. In this example, the control unit 204 automatically controls movement of the window treatment 104 to open the window treatment (either fully or to a greatest extent used by the method).

At step 1114, the control unit 204 automatically controls movement of the window treatment in the sunny operation mode if (1) the computed absolute value of the rate of change is at least the first threshold value or (2) the computed absolute value of the rate of change is less than the first threshold value and the total light intensity is at least the second threshold value. In this example, the window treatment 104 is automatically moved to a closed or (substantially closed) position selected to ensure the comfort of the occupant of the room in which the window treatment system 200 is located.

By summing, integrating or averaging samples of the total light intensity sensor signal over a relatively short period of time (e.g., 2 to 5 minutes), the effects of sensor noise and small deviations in sensor output are reduced. This in turn reduces swings in the computed rate of change of the total light intensity.

Figure 12B:
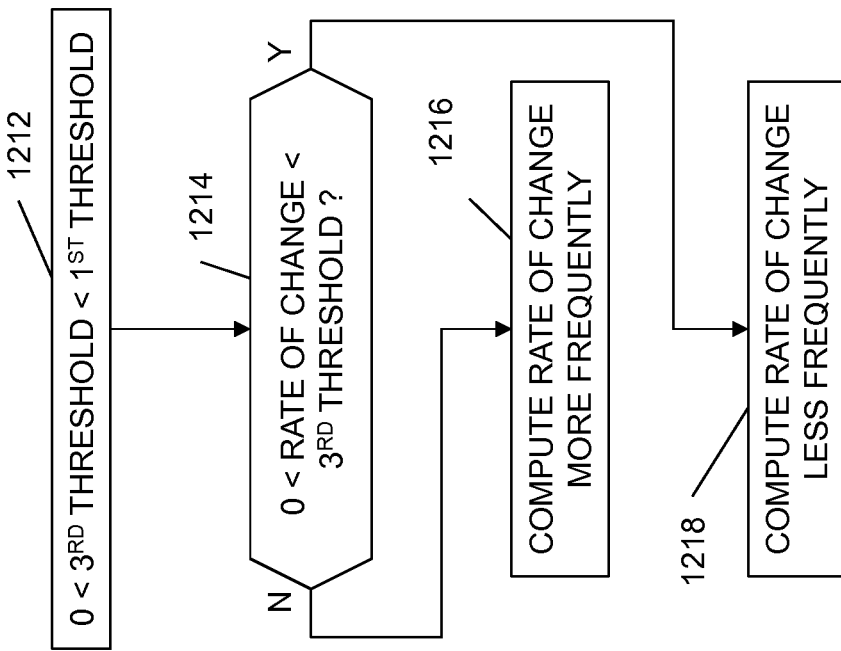
FIGS. 12A-12B show alternative details of the cloudy day operation mode.
Figure 12A:
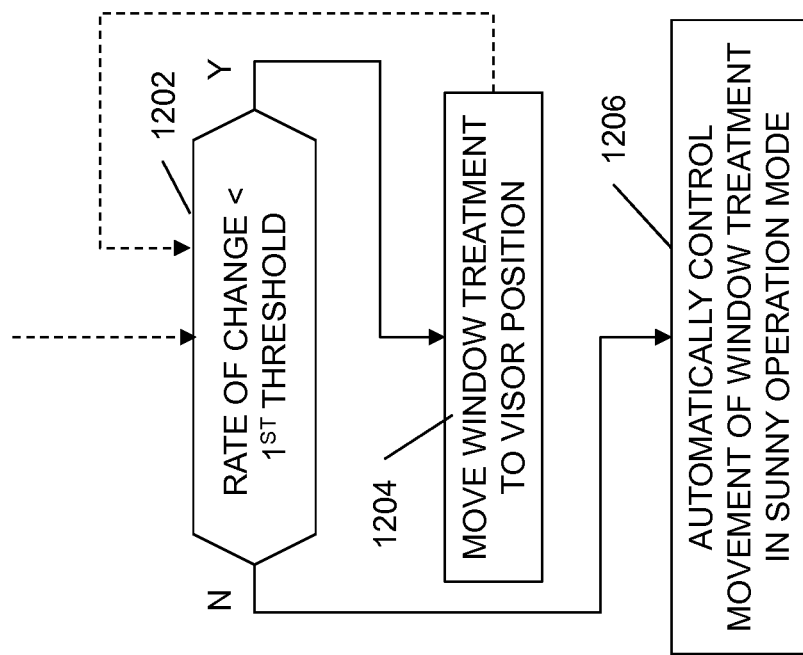

FIG. 12A is a flow chart showing operation of the system in the cloudy operation mode.

At step 1202, a determination is made whether the absolute value of the rate of change of the total light intensity is less than a first threshold. If the absolute value of the rate of change is less than the threshold, step 1204 is performed. If the absolute value of the rate of change is greater than or equal to the threshold, step 1206 is performed.

At step 1204 the window treatment is moved to a "visor" position while the computed absolute value of the rate of change is less than the first threshold value. The visor position is a mostly open position (e.g., 75% to 90% open) which maximizes natural light on cloudy days to minimize lighting loads. The dashed arrow indicates that the evaluation of step 1202 is repeated as long as the system operates in the cloudy operation mode.

At step 1206, if the absolute value of the rate of change is greater than or equal to the first threshold, the system changes state to automatically control movement of the window treatment in the sunny operation mode.

FIG. 12B shows another feature which is used in some embodiments during cloudy operation mode. In some embodiments, the system is biased to protect occupant comfort by responding rapidly to close the window treatment if conditions change from cloudy to sunny, while avoiding distractions due to frequent opening and closing of the window treatment. Thus, the steps of FIG. 12B are performed while in the cloudy day mode (i.e., while the absolute value of the rate of change of total light intensity is less than a first threshold.

At step 1212, a third threshold value is input or selected, such that the third threshold is greater than zero, and lower than the first threshold value. The third threshold value divides the cloudy operation mode into two zones. When the absolute value of the rate of change is low (less than the third threshold), the system preserves battery life by computing the rate of change less often. When the absolute value of the rate of change is high (between the third threshold and the first threshold, the rate of change is computed more often. As a result, when the absolute value of the rate of change crosses above the first threshold, there will be a relatively short delay before the rate of change is next computed and the system is transitioned to the sunny operation mode.

At step 1214, the system computes the rate of change and determines whether the absolute value of the rate of change is between zero and the third threshold (low rate of change). If so, the rate of change is low, and step 1218 is performed. If the rate of change is greater than the third threshold, step 1216 is performed.

At step 1216, the frequency of computing the rate of change becomes (or is maintained) larger.

At step 1218, the frequency of computing the rate of change becomes (or is maintained) less frequent.

In some embodiments, step 1216 uses a first constant frequency and step 1218 uses s a second constant frequency, where the first constant frequency is higher than the second constant frequency. In other embodiments, the frequency at which the rate of change is computed is varied as a function of the rate of change. For example, in some embodiments, the frequency of computing the rate of change is a linear function of the rate of change.

Figure 13A:
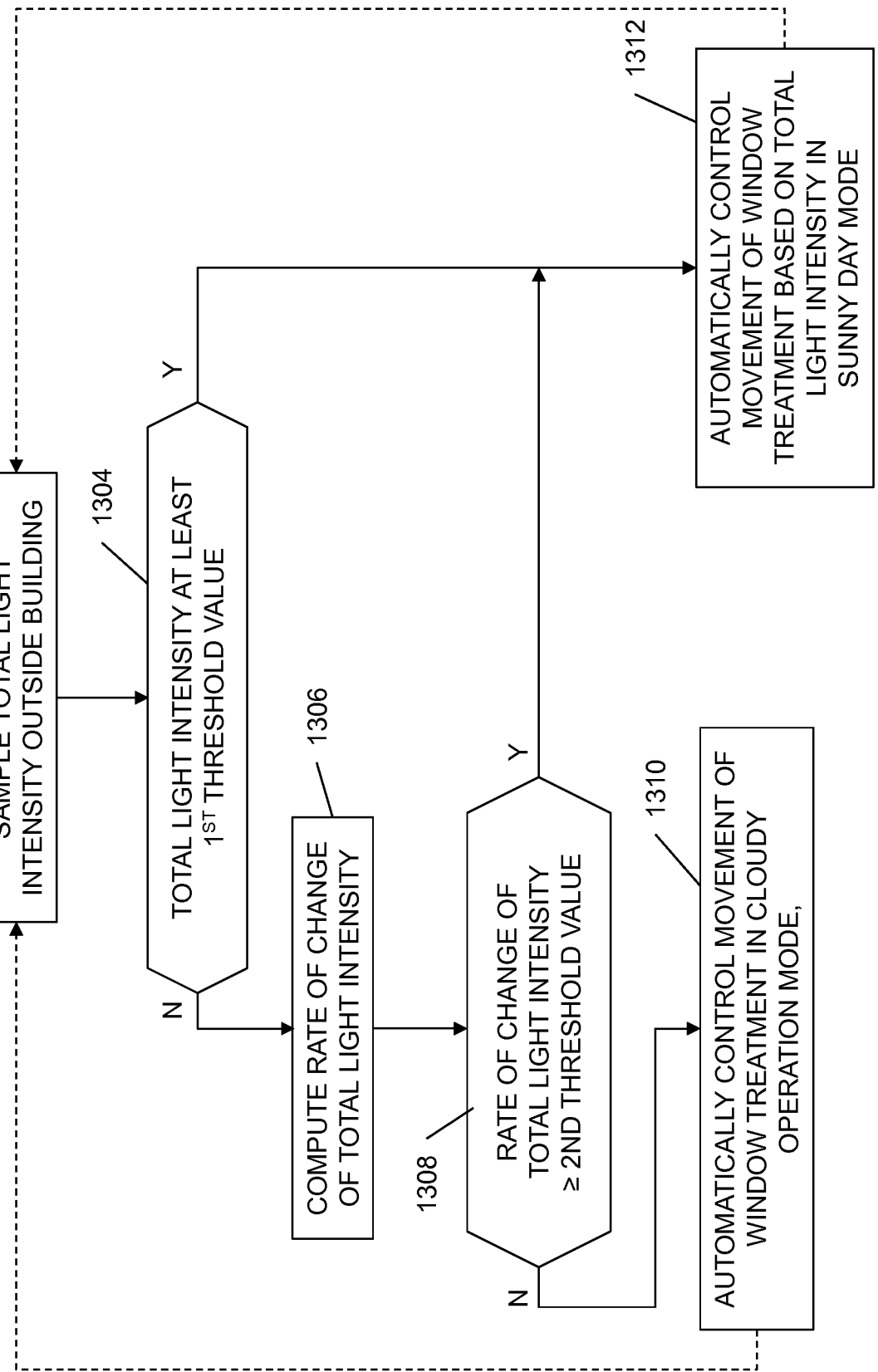
FIG. 13A is a flow chart of a variation of the method of FIG. 9.

FIG. 13A is a flow chart of an alternative program flow for controlling a motorized window treatment positioned adjacent to a window on a wall of a building, in which the total light intensity is evaluated first, and then the rate of change of the total light intensity is evaluated.

At step 1302, a total light intensity is sampled outside of the building.

At step 1304, a determination is made whether the total light intensity is at least a first threshold value. If so, step 1312 is performed. If not, then step 1306 is performed.

At step 1306, a rate of change of the total light intensity is computed.

Steps 1308-1310 automatically control movement of the window treatment based at least partially on a rate of change of the total light intensity if the total light intensity is less than the first threshold value.

At step 1308, a determination is made whether the absolute value of the rate of change is at least a second threshold value. If the absolute value of the rate of change of the total light intensity is at least a second threshold value. step 1312 is performed, for moving the window treatment to a first position. If the absolute value of the rate of change of the total light intensity is less than the second threshold value, step 1310 is performed.

At step 1310, the control unit 204 automatically controls movement of the window treatment in the cloudy operation mode while the total light intensity is less than the first threshold value.

At step 1312,
the control unit 204 automatically controls movement of the window treatment based on the total light intensity if the total light intensity is at least a first threshold value.

Figures 13B, 13C:
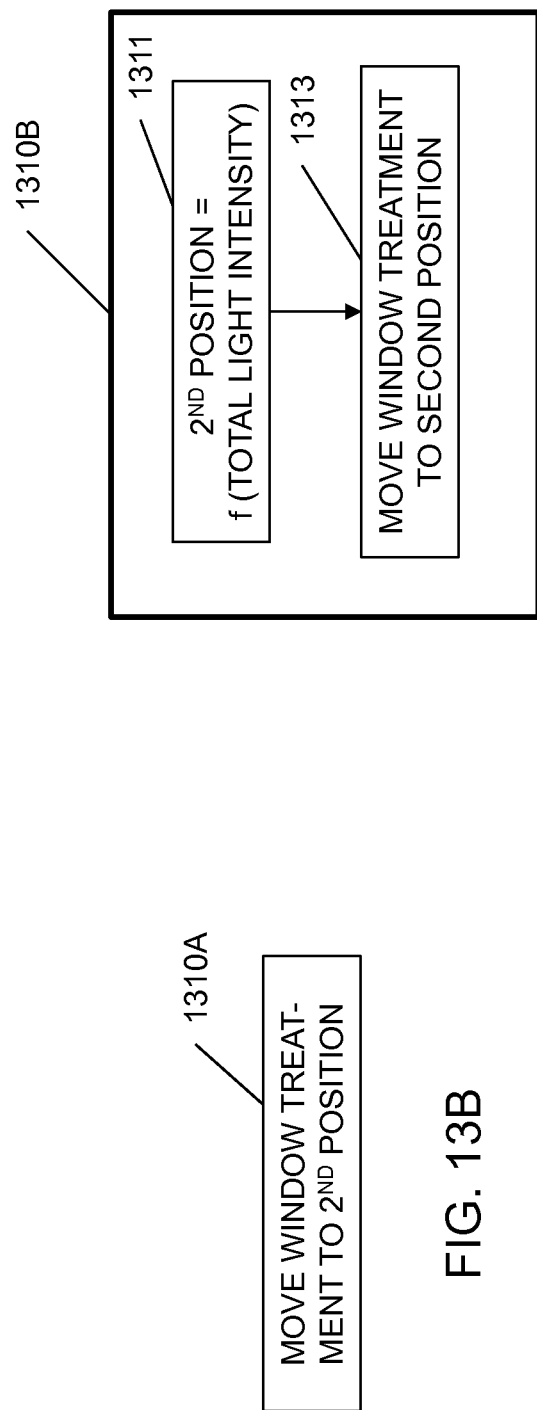
FIGS. 13B and 13C are alternative diagrams of block 1310 of FIG. 13A.

FIG. 13B shows an embodiment of step 1310 of FIG. 13A. In step 1310A, the control unit 204 causes the window treatment to move to a second position if the absolute value of the rate of change of the total light intensity is less than the second threshold value. For example, the second position can be an open or "visor" position used in cloudy operation mode.

Figure 14:
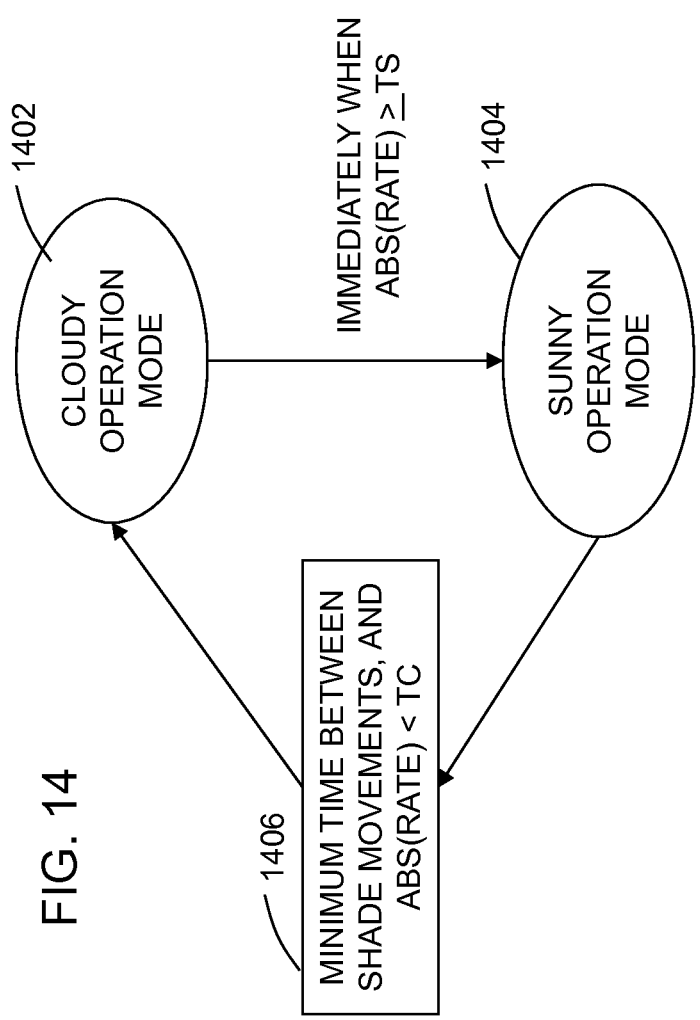
FIG. 14 is a state diagram showing the permissible state changes between the sunny day mode and cloudy day mode.

FIG. 13C shows another embodiment of step 1310 of FIG. 13A. In step 1310B, the control unit 204 causes the window treatment to move the window treatment to a position that varies as a function of the total light intensity if the absolute value of the rate of change of the total light intensity is less than a second threshold value. At sub-step 1311, the control unit calculates a second position as a function of the total light intensity. At sub-step 1313, the control unit 204 causes the window treatment to move to the second position FIG. 14 is a state diagram showing the two operating modes and the allowable transitions in some embodiments.

When the system is operating in the cloudy operation mode 1402, the system will cause the window treatment to move to a fully open or "visor" position (75% to 90% open) to maximize natural light and views. In some embodiments, the setting (e.g., height) of the window treatment in the cloudy operation mode can be set manually by a user. For example, the user actuates a "program" button or control and moves the window treatment to the desired cloudy day position. In other embodiments, the user can select the cloudy day position from a predetermined set of options using a programming button or control.

Because the window treatment is substantially opened in the cloudy mode, a sudden change in lighting conditions (e.g., the sun emerging from behind a large cloud) can result in glare or discomfort to an occupant. Thus, in some embodiments, the system is biased to respond near immediately to such a change. In some embodiments, as soon as a computation of the rate of change of total light intensity indicates that the absolute value of the rate of changes has increased beyond the relevant rate-of-change threshold, the control unit 204 transitions to the sunny operation mode (state 1404). Similarly, as the total light intensity has increased beyond the total-light-intensity threshold, the system transitions to the sunny operation mode (state 1404). On the other hand, if the rate of change of total light intensity has small oscillations above and below the rate of change threshold, the control unit 204 still assumes that this indicates a sunny day. This bias towards treating uncertain situations as being sunny ensures that the occupant is protected from glare or excessively bright light.

As described above with respect to FIG. 12B, in some embodiments, the frequency of rate of change computations is increased when the absolute value of the rate of change is relatively high (closer to the threshold for changing to the sunny operation mode). This further reduces the delay in performing the next computation of the rate of change after the weather changes, so that the control unit 204 causes transition to the sunny operation mode to occur almost immediately.

In some embodiments, the step of controlling the window treatment in the cloudy day mode includes transitioning to control the window treatment in the sunny day mode immediately upon determining that the absolute value of the rate of change of the total light intensity has increased to at least the first threshold value. Meanwhile, the step of controlling the window treatment in a sunny day mode includes causing the window treatment to remain in a sunny day position for at least a predetermined minimum time period before transitioning to a cloudy day position.

Referring again to FIG. 14, once the system is operating in the sunny operation mode at state 1404, the control unit 204 implements a minimum delay at step 1406 before the system is returned. This minimizes distractions due to too-frequent movement of the shades during partly sunny weather, and prolongs battery life. Thus, the transition back to cloudy mode does not occur until the minimum time between shade movements has passed, and the absolute value of the rate of change is less than the relevant threshold.

Figure 15:
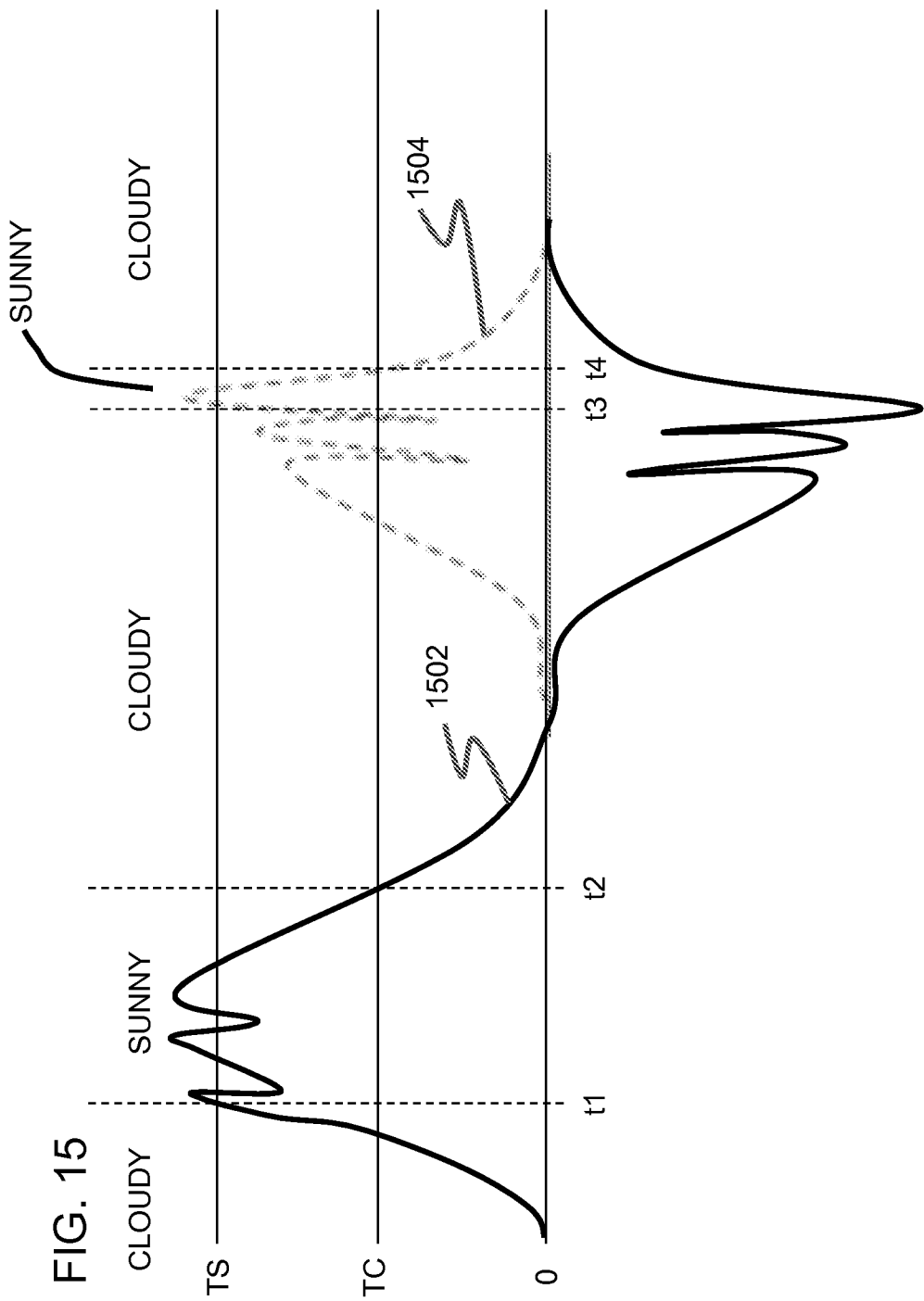
FIG. 15 shows an example of the rate-of-change over time, where two thresholds are used to provide hysteresis for change of operating mode.

FIG. 15 is a diagram of another optional feature which can be included in the control unit 204 to prevent excess distracting movement and battery consumption. The control unit 204 provides hysteresis using two thresholds, TC and TS (instead of a single threshold). When the system is in the cloudy operation mode, the control unit 204 does not transition to the sunny operation mode until the absolute value of the rate of change 1502 of the total light intensity is greater than or equal to a sunny threshold TS (at time t1). When the system is in the sunny operation mode, the control unit 204 does not transition to the cloudy operation mode until the absolute value of the rate of change 1502 of the total light intensity is less than or equal to a cloudy threshold TC.

Thus, in either operation mode, to change state to the other operation mode, the absolute value of the rate of change of the light intensity first passes through both thresholds. In some embodiments, two thresholds TC, TS are used in combination with the minimum delay of block 1406 (FIG. 14) described above. In other embodiments, two thresholds TC, TS are used without a minimum delay.

Also shown in FIGS. 14 and 15, for purpose of cloudy day assessment, the absolute value of the rate of change is used. In the case of a perfectly sunny day with no shadows or obstructions, the rate of change will generally be sinusoidal, and will at times be negative. By using the absolute value of the rate of change, sharp transitions are interpreted as an indication of sunny conditions. A sharp transition can occur on a mostly sunny day for example, when the sun goes behind a cloud (large negative rate of change) or emerges from a cloud (large positive rate of change), Both cases involve mostly sunny days, and are treated the same as a clear sunny day, insofar as control based on the rate of change of total light intensity is concerned. Thus for example, between time t2 and t3, the rate of change 1502 becomes increasingly negative. At time t3, when the absolute value of the rate of change 1504 (shown in phantom) increases beyond the sunny operation threshold TS, control unit 204 again transitions to sunny operation mode. At time t4, when the absolute value of the rate of change 1504 (shown in phantom) decreases below the cloudy operation threshold TC, control unit 204 again transitions to cloudy operation mode.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method of controlling a motorized window treatment, the method comprising:
comparing a light level measured by at least one sensor to a stored light level value;
if a total light level measured by the at least one sensor differs from the stored light level value, then:
setting a cloudy-day threshold value to a first threshold value if a solar elevation angle is greater than a solar elevation cut-off value; and
determining the cloudy-day threshold value as a function of the solar elevation angle if the solar elevation angle is less than the solar elevation cut-off value; and
operating the motorized window treatment in a first mode if the light level measured by the at least one sensor is less than a second threshold value.

2. The method of claim 1, further comprising:
operating the motorized window treatment in a second mode if the light level measured by the least one sensor is greater than the second threshold value.

3. The method of claim 2, wherein operating the motorized window treatment in the second mode includes controlling movement of a window covering of the motorized window treatment according to a timeclock schedule to limit a sun penetration distance.

4. The method of claim 2, wherein operating the motorized window treatment in the first mode includes moving a window covering of the motorized window treatment to a visor position.

5. The method of claim 2, wherein the first mode is a cloudy-day mode and the second mode is a sunlight penetration limiting mode.

6. The method of claim 5, wherein operating the motorized window treatment in the sunlight penetration limiting mode includes:
determining if a total intensity of light is greater than a third threshold value;
moving a window covering of the motorized window treatment to a first position if the total intensity of light is greater than the third threshold value; and
moving the window covering of the motorized window treatment to a second position if the total intensity of light is less than the third threshold value.

7. The method of claim 6, wherein the covering covers more of a window when the window covering is disposed in the first position than when the window covering is disposed in the second position.

8. The method of claim 7, wherein the window covering covers at least 75 percent of the window when the window covering is disposed in the first position.

9. The method of claim 7, wherein the window covering covers less than 25 percent of the window when the window covering is disposed in the second position.

10. The method of claim 1, wherein the stored light level value is a previous light level measured by the at least one sensor.

11. The method of claim 10, further comprising:
calculating the solar elevation angle prior to determining the cloudy-day threshold value as a function of the solar elevation angle.

12. The method of claim 11, wherein the solar elevation cut-off value is approximately 15 degrees.

13. The method of claim 1, wherein the cloudy-day threshold value is a function of a constant threshold value, the solar elevation angle, and the solar elevation cut-off value.

14. A system, comprising:
a motorized window treatment adapted to be positioned adjacent to a window;
at least one sensor; and
a processor in signal communication with the at least one sensor and the motorized window treatment, the processor configured to:
compare a light level measured by the at least one sensor to a stored light level value;

if a total light level measured by the at least one sensor differs from the stored light level value, then processor is configured to:
set a cloudy-day threshold value to a first threshold value if a solar elevation angle is greater than a solar elevation cut-off value, and
determine the cloudy-day threshold value as a function of the solar elevation angle if the solar elevation angle is less than the solar elevation cut-off value.

15. The system of claim 14, wherein the processor is configured to:
operate the motorized window treatment in a first mode if the light level measured by the at least one sensor is less than a second threshold value; and
operate the motorized window treatment in a second mode if the light level measured by the least one sensor is greater than the second threshold value.

16. The system of claim 15, wherein the processor is configured to control movement of a window covering of the motorized window treatment according to a timeclock schedule to limit a sun penetration distance when operating the motorized window treatment in the second mode.

17. The system of claim 15, wherein the processor is configured to control movement of a window covering of the motorized window treatment to a visor position when operating the motorized window treatment in the first mode.

18. The system of claim 15, wherein the first mode is a cloudy-day mode and the second mode is a sunlight penetration limiting mode.

19. The system of claim 18, wherein, when the processor operates the motorized window treatment in the sunlight penetration limiting mode, the processor is configured to:
determine if a total intensity of light is greater than a third threshold value;
control movement of a window covering of the motorized window treatment to a first position if the total intensity of light is greater than the third threshold value; and
control movement of the window covering of the motorized window treatment to a second position if the total intensity of light is less than the third threshold value.

20. The system of claim 19, wherein the processor is configured to:
calculate the solar elevation angle prior to determining the cloudy-day threshold value as a function of the solar elevation angle.

* * * * *